(12) United States Patent
Lahann et al.

(10) Patent No.: US 7,947,772 B2
(45) Date of Patent: *May 24, 2011

(54) MULTIPHASIC NANO-COMPONENTS COMPRISING COLORANTS

(75) Inventors: Joerg Lahann, Ann Arbor, MI (US); Kyung-Ho Roh, Mountain View, CA (US); David C. Martin, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 86 days.

This patent is subject to a terminal disclaimer.

(21) Appl. No.: 12/137,121

(22) Filed: Jun. 11, 2008

(65) Prior Publication Data

US 2008/0242774 A1 Oct. 2, 2008

Related U.S. Application Data

(63) Continuation-in-part of application No. 11/272,194, filed on Nov. 10, 2005, now Pat. No. 7,767,017.

(60) Provisional application No. 60/626,792, filed on Nov. 10, 2004, provisional application No. 60/651,288, filed on Feb. 9, 2005.

(51) Int. Cl.
```
B32B 9/00      (2006.01)
B32B 19/02     (2006.01)
B44C 1/26      (2006.01)
B44C 1/28      (2006.01)
B44C 3/12      (2006.01)
```

(52) U.S. Cl. .......... 524/424; 524/99; 524/190; 524/413; 524/430; 524/431; 524/612; 428/67; 428/457; 428/689; 428/690; 428/704; 424/422; 252/301.36; 252/301.4 R; 252/301.6 S; 106/401; 106/436; 106/472; 106/474

(58) Field of Classification Search ................ 524/99, 524/190, 431, 612, 413, 424, 430; 424/422; 252/301.36, 301.4 R, 301.6 S; 106/401, 106/436, 472, 474; 428/67, 457, 689, 690, 428/704
See application file for complete search history.

(56) References Cited

U.S. PATENT DOCUMENTS

| | | | |
|---|---|---|---|
| 3,060,429 A | 10/1962 | Winston | |
| 4,621,268 A | 11/1986 | Keeling et al. | |
| 5,560,543 A | 10/1996 | Smith et al. | |
| 5,741,138 A | 4/1998 | Rice et al. | |
| 5,813,614 A | 9/1998 | Coffee | |
| 6,007,845 A | 12/1999 | Domb et al. | |
| 6,063,365 A | 5/2000 | Shefer et al. | |
| 6,107,102 A | 8/2000 | Ferrari | |
| 6,132,702 A | 10/2000 | Witt et al. | |
| 6,252,129 B1 | 6/2001 | Coffee | |
| 6,267,724 B1 | 7/2001 | Taylor | |
| 6,306,993 B1 | 10/2001 | Rothbard et al. | |
| 6,391,471 B1 | 5/2002 | Hiraoka et al. | |
| 6,491,902 B2 | 12/2002 | Shefer et al. | |
| 6,548,264 B1 | 4/2003 | Tan et al. | |
| 6,589,562 B1 | 7/2003 | Shefer et al. | |
| 6,669,961 B2 | 12/2003 | Kim et al. | |
| 6,685,921 B2 | 2/2004 | Lawlor | |
| 6,703,235 B2 | 3/2004 | Luebke et al. | |
| 6,766,817 B2 | 7/2004 | da Silva | |
| 6,811,090 B2 | 11/2004 | Yogi et al. | |
| 6,825,161 B2 | 11/2004 | Shefer et al. | |
| 6,918,404 B2 | 7/2005 | Dias da Silva | |
| 7,066,586 B2 | 6/2006 | da Silva | |
| 7,413,868 B2 | 8/2008 | Kauvar et al. | |
| 7,767,017 B2 | 8/2010 | Lahann et al. | |
| 2006/0201390 A1 | 9/2006 | Lahann et al. | |
| 2007/0054119 A1 | 3/2007 | Garstecki et al. | |
| 2007/0112180 A1 | 5/2007 | Gray et al. | |
| 2007/0167340 A1 | 7/2007 | Barthel et al. | |
| 2007/0231355 A1 | 10/2007 | Quadir et al. | |
| 2007/0237800 A1 | 10/2007 | Lahann | |
| 2008/0242774 A1 | 10/2008 | Lahann et al. | |
| 2010/0038830 A1 | 2/2010 | Lahann et al. | |

FOREIGN PATENT DOCUMENTS

| | | |
|---|---|---|
| EP | 1809719 | 7/2007 |
| JP | 2004-505761 | 2/2004 |
| JP | 2005504090 | 2/2005 |
| JP | 2008520407 | 6/2008 |
| WO | WO 02/13786 | 2/2002 |
| WO | WO 03/026611 | 4/2003 |
| WO | WO 2006/003403 | 1/2006 |
| WO | WO 2006/137936 | 12/2006 |
| WO | WO 2007/149310 | 12/2007 |
| WO | WO 2009/055693 | 4/2009 |
| WO | WO 2009/151421 | 12/2009 |
| WO | WO 2010/011641 | 1/2010 |

(Continued)

OTHER PUBLICATIONS

Barrero, A. et al., "Micro- and Nanoparticles via Capillary Flows," Annu. Rev. Fluid Mech., vol. 39, pp. 89-106 (2007).

(Continued)

*Primary Examiner* — Kriellion A Sanders

(74) *Attorney, Agent, or Firm* — Harness, Dickey & Pierce, P.L.C.

(57) ABSTRACT

Multiphasic colorant nano-components (MPCs) having at least two phases and at least one colorant are provided. In certain aspects, the at least two phases are optically or visually distinct from one another. The MPCs can be used in various methods in various applications, such as visual, optical, and/or electronic displays, including in paints, inks, coatings, plastics, textiles, electronic display devices, pixels, or electronic paper. The MPCs are formed by methods of electrified jetting of polymers.

23 Claims, 9 Drawing Sheets

FOREIGN PATENT DOCUMENTS

| WO | WO 2010/032971 | 11/2010 |
|----|----------------|---------|
| WO | WO 2010/127119 | 11/2010 |

OTHER PUBLICATIONS

Cayre, O., et al., "Fabrication of Asymmetrically Coated Colloid Particles by Microcontact Printing Techniques," J. Mater. Chem., vol. 13, pp. 2445-2450 (2003).
Cayre, O., et al., "Fabrication of Dipolar Colloid Particles by Microcontact Printing," Chem. Commun., pp. 2296-2297 (2003).
Erhardt, R., et al., "Amphiphilic Janus Micelles With Polystyrene and Poly(methacrylic acid) Hemispheres," J. Am. Chem. Soc., vol. 125, pp. 3260-3267 (2003).
Erhardt, R., et al., "Janus Micelles," Macromolecules, vol. 34, pp. 1069-1075 (2001).
Farokhzad, O. et al., "Nanoparticle-Aptamer Bioconjugates: A New Approach for Targeting Prostate Cancer Cells," Cancer Research, vol. 64, pp. 7668-7672 (2004).
Guo, K. et al., "Aptamer-based capture molecules as a novel coating strategy to promote cell adhesion," J. Cell. Mol. Med., vol. 9, No. 3, pp. 731-736 (2005).
Hicke, B. et al., "Tumor Targeting by an Aptamer," J. of Nuclear Med., vol. 47, No. 4, pp. 668-678 (2006).
Larsen, G., et al., "A Method for Making Inorganic and Hybrid (Organic/Inorganic) Fibers and Vesicles with Diameters in the Submicrometer and Micrometer Range via Sol-Gel Chemistry and Electrically Forced Liquid Jets," J. Am. Chem. Soc., vol. 125, pp. 1154-1155 (2003).
Loscertales, I. et al., "Electrically Forced Coaxial Nanojets for One-Step Hollow Nanofiber Design," J. Am. Chem. Soc., vol. 126, pp. 5376-5377 (2004).
Loscertales, I. et al., "Production of complex nano-structures by electro-hydro-dynamics," Mater. Res. Soc. Symp. Proc., vol. 860E, pp. LL5.9.1-LL5.9.6 (2005).
Marin, A. et al., "Simple and Double Emulsions via Coaxial Jet Electrosprays," The Amer. Phys. Soc., vol. 98, pp. 014502-1 to 014502-4 (2007).
Paunov, V., et al., "Novel Technique for Preparation of Dipolar Microparticles by Polymerization of Polarised Emulsions," Abstract Central, 1 page (undated).
Perro, A., et al., "Design and Synthesis of Janus Micro- and Nanoparticles," The Royal Soc. of Chem., vol. 15, pp. 3745-3760 (2005).
Roh, K., et al., "Biphasic Janus Particles with Nanoscale Anisotrophy," Nature Materials, vol. 4, pp. 759-763 (2005).
Roh, K., et al., "Triphasic Nanocolloids," J. Am. Chem. Soc., vol. 128, pp. 6796-6797 (2006).
Uhrich, K. et al., "Polymeric Systems for Controlled Drug Release," Chem. Rev., vol. 99, pp. 3181-3198 (1999).
Berkland C., et al., "Controlling surface nano-structure using flow-limited field-injection electrostatic spraying (FFESS) of poly(D,L-lactide-co-glycolide)," Biomaterials, vol. 25, No. 25, pp. 5649-5658 (Nov. 2004).
Bhaskar, S. et al., "Spatioselective Modification of Bicompartmental Polymer Particles and Fibers via Huisgen 1,3-Dipolar Cycloaddition," Macromol. Rapid Commun., vol. 29, No. 20, pp. 1655-1660 (Oct. 22, 2008). First published online Sep. 12, 2008.
Binks, B. P. et al., "Particles Adsorbed at the Oil-Water Interface: A Theoretical Comparison between Spheres of Uniform Wettability and "Janus" Particles," Langmuir, vol. 17, pp. 4708-4710 (2001).
Casagrande, C. et al., "Janus Beads: Realization and Behaviour at Water/Oil Interfaces," Europhys. Lett., vol. 9, No. 3, pp. 251-255 (1989).
Cloupeau, M. et al., "Electrohydrodynamic spraying functioning modes—a critical—review," J. Aerosol Sci., vol. 25, No. 6, pp. 1021-1036 (1994).
Cloupeau, M. et al., "Electrostatic spraying of liquids—Main functioning modes," J. Electrostatics, vol. 25, pp. 165-184 (1990).
De La Mora, J. F. et al., "The current emitted by highly conducting Taylor cones," J. Fluid Mech., vol. 260, pp. 155-184 (1994).
Fridrikh, S. V. et al., "Controlling the Fiber Diameter during Electrospinning," Phys. Rev. Lett., vol. 90, No. 14, pp. 144502-1 to 144502-4 (2003).
Gomez, A. et al., "Charge and fission of droplets in electrostatic sprays," Phys. Fluids, vol. 6, No. 1, pp. 404-414 (1994).
Gunatillake, P. et al., "Biodegradable Synthetic Polymers for Tissue Engineering," European Cells and Materials, vol. 5, pp. 1-16 (2003).
Gupta, P. et al, "Some investigations on the fiber formation by utilizing a side-by-side bicomponent electrospinning approach," Polymer, vol. 44, pp. 6353-6359 (2003).
Hohman, M. M. et al., "Electrospinning and electrically forced jets. II. Applications," Physics of Fluids, vol. 13, No. 8, pp. 2221-2236 (2001).
Hohman, M. M. et al., "Electrospinning and electrically forced jets. I. Stability Theory," Physics of Fluids, vol. 13, No. 8, pp. 2201-2220 (2001).
Huang, Z. et al., "A review on polymer nanofibers by electrospinning and their applications in nanocomposites," Comp. Sci. Tech., vol. 63, pp. 2223-2253 (2003).
International Search Report and Written Opinion of the International Searching Authority issued on Mar. 8, 2010 in cross-referenced matter PCT/US2009/051238 (WO2010/011641).
International Search Report and Written Opinion of the International Searching Authority issued on Mar. 11, 2009 in corresponding related cross-referenced matter PCT/US2008/007372 (WO 2009/151421).
International Search Report and Written Opinion of the International Searching Authority issued on Jul. 23, 2009 in cross-referenced matter PCT/US2008/081145 (WO 2009/055693).
International Search Report and Written Opinion of the International Searching Authority issued on Apr. 3, 2007 in PCT International Application PCT/US2005/040560 (WO 2006/137936).
Kazemi, A., et al., "Environmentally Responsive Core/Shell Particles via Electrohydrodynamic Co-jetting of Fully Miscible Polymer Solutions," Small, vol. 4, No. 10, pp. 1756-1762 (2008).
Lahann, J. et al., "Biphasic nanoparticles made by electrified jetting," 2005 APS March meeting, (Mar. 22, 2005).
Loscertales, I. et al., "Micro/nano Encapsulation via Electrified Coaxial Liquid Jets," Science, vol. 295, pp. 1695-1698 (2002).
Nie, Z. et al., "Janus and Ternary Particles Generated by Microfluidic Synthesis: Design, Synthesis, and Self-Assembly," J. Am. Chem. Soc., vol. 128, pp. 9408-9412 (2006).
Nisisako, T. et al., "Synthesis of Monodisperse Bicolored Janus Particles with Electrical Anisotropy Using a Microfluidic Co-Flow System," Adv. Mater., vol. 18, pp. 1152-1156 (2006).
Non-Final Office Action for U.S. Appl. No. 11/763,842 (U.S. Pub. No. 2007/0237800) dated Jun. 18, 2010.
Non-Final Office Action for U.S. Appl. No. 12/257,945 (U.S. Pub. No. 2010/0038830) dated May 14, 2010.
Non-Final Office Action for U.S. Appl. No. 12/506,712 (U.S. Pub. No. 2010/0015447) dated Sep. 22, 2010.
Notice of Rejection issued on Jul. 27, 2010 in related matter Japanese Patent Publication JP 2007-540191. English translation provided by Kashiwabara International Patent Bureau.
Palm, L. et al., "An Optical Method for Measuring Drop Flight Stability in a Continuous Ink Jet," Journal for Imaging Science and Technology, vol. 41, No. 1 (Jan./Feb. 1997).
Response filed on Nov. 12, 2010 to Non-Final Office Action dated May 14, 2010 for U.S. Appl. No. 12/257,945 (U.S. Pub. No. 2010/0038830).
Response filed on Nov. 18, 2010 to Non-Final Office Action dated Jun. 18, 2010 for U.S. Appl. No. 11/763,842 (U.S. Pub. No. 2007/0237800).
Response filed on Oct. 19, 2010 to Non-Final Office Action dated Sep. 22, 2010 for U.S. Appl. No. 12/506,712 (U.S. Pub. No. 2010/0015447).
Rodenberg, E.J. et al., "Peptides Derived from Fibronectin Type III Connecting Segments Promote Endothelial Cell Adhesion but Not Platelet Adhesion: Implications in Tissue-Engineered Vascular Grafts," Tissue-Engineering, vol. 13, No. 11 pp. 2653-2665 (2007).

Rosell-Llompart, J. et al., "Generation of Monodisperse Droplets 0.3 to 4 βm in Diameter from Electrified Cone-Jets of Highly Conducting and Viscous Liquids," J. Aerosol Sci., vol. 25, No. 6, pp. 1093-1119 (1994).

Shepherd, R. F. et al., "Microfluidic Assembly of Homogeneous and Janus Colloid-Filled Hydrogel Granules," Langmuir, vol. 22, pp. 8618-8622 (2006).

Shin, Y. M. et al., "Electrospinning: A whipping fluid jet generates submicron polymer fibers," Appl. Phys. Lett, vol. 78, No. 8, pp. 1149-1151 (2001).

Sun, Q. et al., "Design of Janus Nanoparticles with Atomic Precision," 2008 APS March meeting (Mar. 13, 2008).

Sun, Z. C. et al., "Compound Core-Shell Polymer Nanofibers by Co-Electrospinning," Adv. Mater., vol. 15, No. 22, pp. 1929-1932 (2003).

Takei, H. et al., "Gradient Sensitive Microscopic Probes Prepared by Gold Evaporation and Chemisorption on Latex Spheres," Langmuir, vol. 13, No. 7, pp. 1865-1868 (1997).

Written Opinion of the International Searching Authority issued on Jul. 21, 2008 in PCT International Application PCT/US2007/014028 (WO 2007/149310).

Zeleny, J., "Instability of electrified liquid surfaces," Phys. Rev., vol. 10, No. 1, pp. 1-6 (1917).

MULTIPHASIC NANO-COMPONENTS COMPRISING COLORANTS

CROSS-REFERENCE TO RELATED APPLICATIONS

This application is a continuation-in-part of U.S. patent application Ser. No. 11/272,194 filed on Nov. 10, 2005, which claims the benefit of U.S. Provisional Application Ser. No. 60/626,792, filed on Nov. 10, 2004 and the benefit of U.S. Provisional Application Ser. No. 60/651,288, filed Feb. 9, 2005. The disclosures of the above applications are incorporated herein by reference in their respective entireties.

FIELD

The present disclosure relates to the fabrication of nanoparticles, and more particularly to the fabrication of polymer-based nanoparticles comprising one or more colorants.

BACKGROUND

The statements in this section merely provide background information related to the present disclosure and may not constitute prior art.

Several multi-component jetting systems form particles having coaxial geometry, such as electrospraying and electospinning. Such systems typically employ capillaries having outer and inner liquid feeding channels creating sustained core and shell layers that form core-shell geometry particles. However, it would be desirable to have improved methods of forming nanometer-sized particles having greater versatility to form multiphasic particles having a wide variety of compositions. Moreover, it would be desirable to have methods of forming nanoscale particles via a jetting system that provides greater control over processing and better ability to form and control various particle morphologies and/or geometries. Further, it would be desirable to provide anisotropic particles comprising colorants having multiple phases with distinct properties and/or compositions to provide optical or visual distinctiveness to facilitate use in a variety of applications, including in electronic displays.

SUMMARY

In various aspects, the present disclosure provides methods for forming multiphasic nano-components having at least one colorant. Such nano-components optionally comprise a first phase and at least one additional phase distinct from the first phase, where at least one of the first and/or second phases includes at least one colorant. In certain aspects, methods of the present disclosure include forming a composite stream by contacting a portion of a first liquid stream with a portion of a second liquid stream. The first and second liquid streams are compositionally distinct from one another. Moreover, at least one of the first and second liquid streams comprises a colorant. Such a method further includes exposing at least a portion of the composite stream to an electric force field sufficient to form a solid nano-component. The solid nano-component comprises a first phase and a second distinct phase, where the first phase comprises material from the first liquid stream and the second phase comprises material from the liquid stream, such that the first and second phases of the nano-component are compositionally distinct from one another.

In various aspects, the present disclosure further provides multiphasic nano-components comprising a first phase and at least one additional phase distinct from the first phase. In certain aspects, the at least one additional phase comprises a plurality of distinct phases. In various aspects, at least one of the first phase and the additional phase comprises a polymer or polymer precursor. Further, the first phase comprises a first colorant and the additional phase comprises a second colorant, thus forming a multiphasic nano-component having optically distinct phases.

In yet other aspects, the present disclosure provides a multiphasic nano-component comprising a first phase and at least one additional phase distinct from the first phase, where at least one of the first phase and the additional phase comprises a polymer or polymer precursor. A first colorant present in the first phase and a second colorant present in the second phase are optionally selected from materials including a pearlescent pigment, a metallic flake pigment, a cholesteric liquid crystal (CLC) pigment, an ultramarine pigment, a fluorescent pigment, a phosphorescent pigment, an inorganic pigment, a carbon black pigment, a natural pigment, an organic pigment, a mixed metal oxide pigment, an iron oxide pigment, a titanium dioxide pigment, a metal colorant, a ceramic colorant, a plastic colorant, an organic azo pigment, an organic polycyclic pigment, a dyeing lake pigment, an azine pigment, a direct dye, a vat dye, a sulfur dye, a reactive dye, a disperse dye, an acid dye, an azoic dye, a synthetic dye, a basic dye, a laser dye, a polymeric dye, a natural dye, a fluorescent dye, and/or a phosphorescent dye. The first phase and the at least one additional phase each have an exposed surface and form a nano-component having optically distinct exposed surfaces.

In various aspects, multiphasic colorant nano-components made in accordance with various teachings of the present disclosure are versatile and stable and can be used in a variety of applications, such as visual, optical, and/or electronic displays, including in paints, inks, coatings, plastics, textiles, electronic display devices, or electronic paper, by way of non-limiting example. In certain aspects, one or more phases of the multiphasic nano-component optionally include a component responsive to a controllable external force field, making the multiphasic nano-component having colorants suitable for use as a pixel for an electronic display, for example. In yet other aspects, multiphasic nano-component optionally include a component or have one or more exposed phase surfaces that enable relative orientation and self-assembly of the nano-components on a surface or substrate.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 9A:
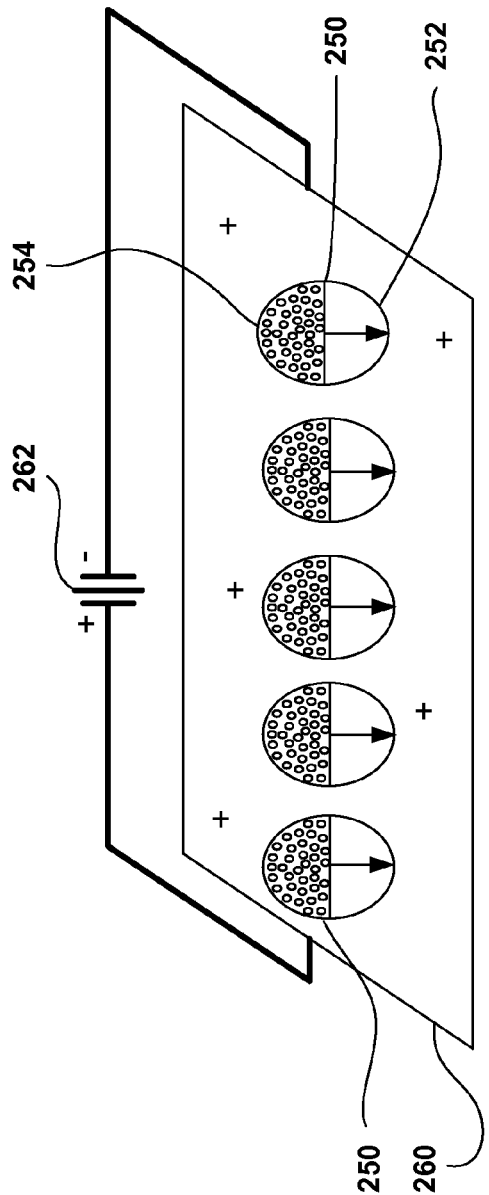
Figure 9B:
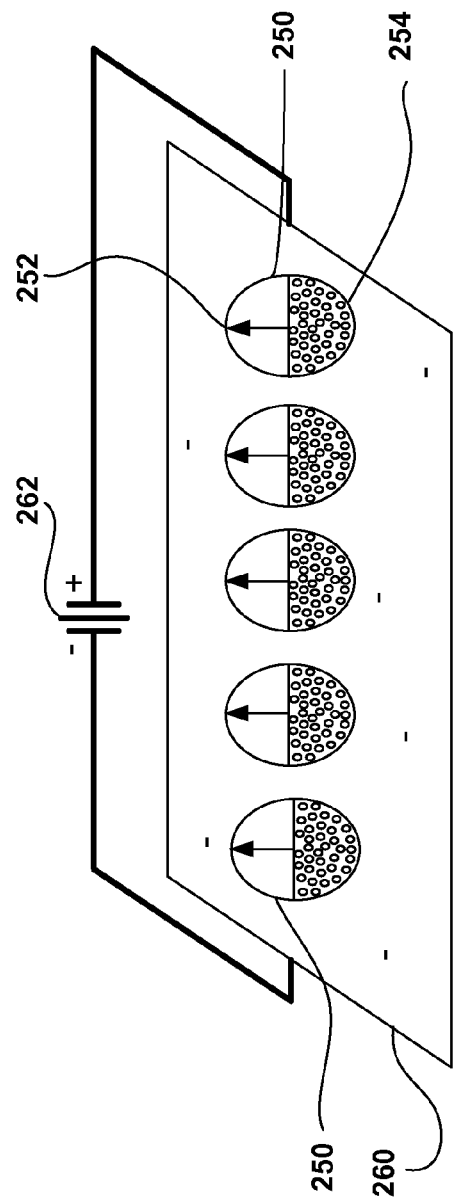

FIG. 9A is a schematic illustration showing a plurality of anisotropic multiphasic nano-components having two visually distinct phases, where the nano-components are disposed on a substrate surface having a controllable electrical field to provide an orientation to the nano-components and to control the appearance of the surface of the substrate; and FIG. 9B shows a schematic illustration of the plurality of anisotropic multiphasic nano-components shown in FIG. 9A, where the controllable electrical field is reversed to an opposite polarity, so that the appearance of the surface is modified by changing the orientation of the nano-components along the substrate surface.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 5:
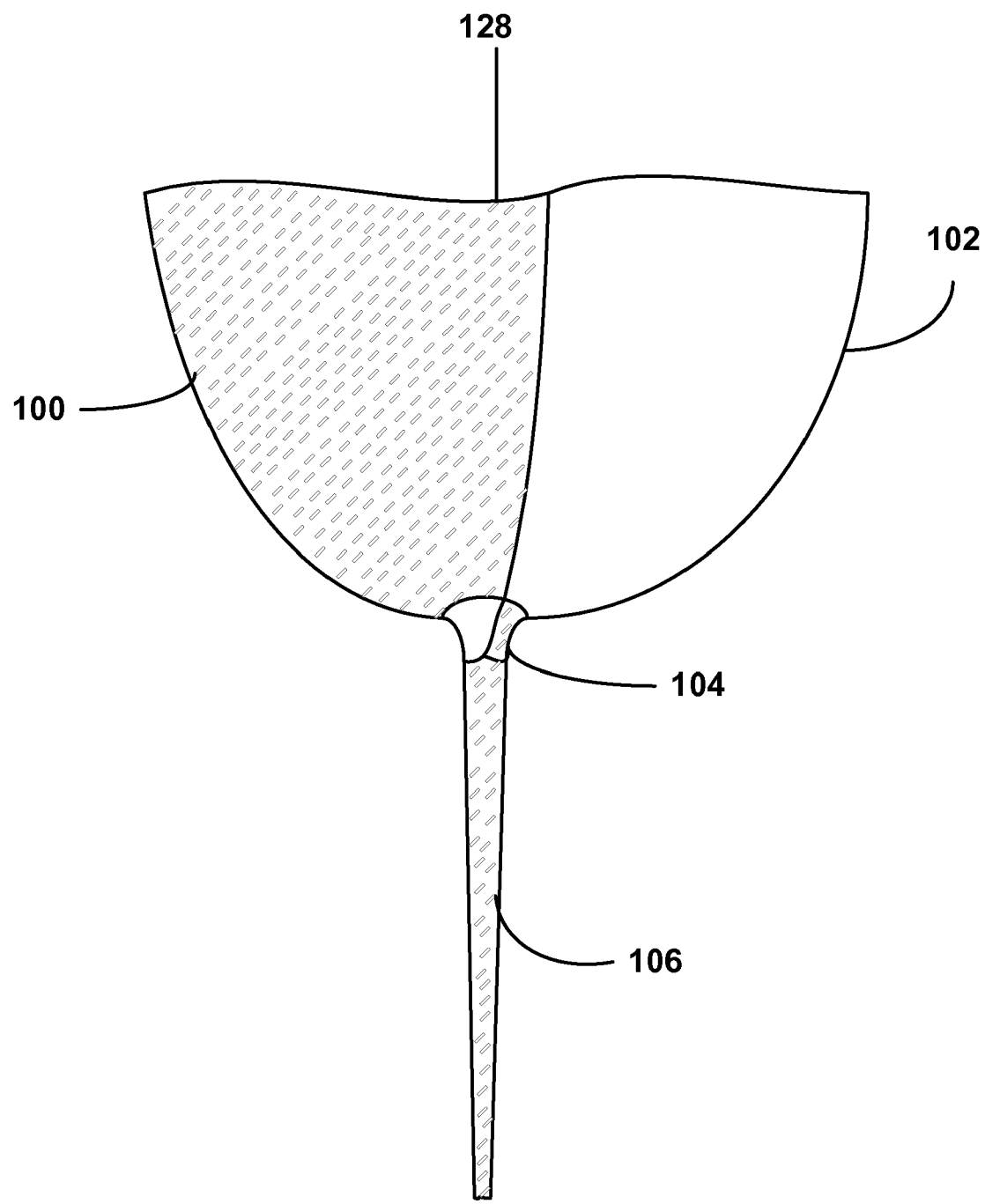
FIG. 5 is a schematic illustrating a Taylor cone formed during electrified jetting techniques used in accordance with the present teachings.

Anisotropic multiphasic nano-components possessing two or more distinct phases, at least one of which comprises a colorant, are desirable for use in a variety of applications for nanotechnology. The ability to selectively modify exposed surfaces of a multiphasic object makes such processes and systems very attractive and versatile for electronic, industrial, cosmetic, biotechnology, and biomedical applications, by way of non-limiting example. In accordance with the present disclosure, a process involving electrified jetting is used to create such anisotropic multiphase nano-components. In suitable electrified jetting techniques, liquid jets having a nanometer-sized diameter are shaped using electro-hydrodynamic forces. When a pendant droplet of conductive liquid is exposed to an electric potential, for example, of a few kilovolts, the force balance between electric field and surface tension causes the meniscus of the pendent droplet to develop a conical shape, the so-called "Taylor cone," as shown in FIG. 5, which will be described in greater detail below. Above a critical point, a highly charged liquid jet is ejected from the apex of the cone, thus forming a nano-component, such as a particle or fiber. Such electrical jetting techniques can be used in accordance with the present teachings to fabricate anisotropic nanoparticles that can be useful for color or optical applications, where the special properties of the resulting colorant particles (amphiphilic, controlled pigment shapes, nano-scale design) lead to their usefulness in paints, inks, displays or electronic paper, for example.

In various aspects, the present teachings provide multiphasic components, such as biphasic nanoparticles, comprising one or more colorants. Such multiphasic nano-components colorants can be used in a variety of visual displays, such as paints, coatings, plastics, textiles, electronic displays, or electronic paper, by way of non-limiting example. In various aspects of the present disclosure, a process is provided that uses electrified jetting techniques to fabricate polymer-based multiphasic colorants (MPCs). In certain aspects, such multiphasic colorants are nano-components.

A "nano-component" is a material that has a variety of shapes or morphologies, however, generally has at least one spatial dimension that is less than about 10 µm (i.e., 10,000 nm). The term "nano-sized" or "nanometer-sized" is generally understood by those of skill in the art to mean less than about 10 µm (i.e., 10,000 nm), optionally less than about 2 µm (i.e., less than about 2,000 nm), optionally less than about 0.5 µm (i.e., 500 nm), and in certain aspects, less than about 200 nm. In certain aspects, a nano-component as used herein has at least one spatial dimension that is greater than about 1 nm and less than about 10,000 nm. In certain aspects, a nano-component has at least one spatial dimension of about 5 to about 5,000 nm. In some aspects, at least one spatial dimension of the nano-component is about 20 to about 2,000 nm. In still other variations, nano-components have at least one spatial dimension of about 50 to about 500 nm.

In certain aspects, nano-components comprise materials in a solid phase or a semi-solid phase, although liquid phases are contemplated in certain variations. The term "structural component" as used herein means a compound of the nano-component that renders the nano-object solid. As mentioned above, the nano-components (used interchangeably with the term "nano-objects") may have a variety of geometries or morphologies, including, by way of non-limiting example, spheres, rectangles, polygons, disks, ellipsoids, toroids, cones, pyramids, rods/cylinders, beads-on-a-string, fibers, and the like. Nano-fibers generally have an elongated axial dimension that is substantially longer than the other dimensions of the nano-fiber. A "nano-particle" generally refers to a nano-component where all three spatial dimensions are nano-sized and less than or equal to several micrometers (e.g., less than about 10,000 nm). Again, in certain variations, nano-particles have at least one spatial dimension of about 5 nm to about 5,000 nm. In another variation, nano-particles have at least one spatial dimension of about 20 nm to about 2,000 nm. In still other variations, nano-particles have at least one spatial dimension from about 50 to about 500 nm. Nano-spheres are nano-components that are substantially spherical. Nano-rods are nano-components that are substantially cylindrical or rod-shaped.

In certain aspects, at least one phase of the multiphasic composition or nano-component comprises at least one colorant. As appreciated by one of skill in the art, the first phase and the second phase (or additional distinct phases) can optionally include other colorants that are the same or different from one another. Thus, in certain aspects, the multiphasic component comprises a first phase having a first colorant and a second distinct phase having a second colorant. For example, where a multiphasic composition comprises a first phase and a second distinct phase, the first phase comprises the first colorant (or a plurality of colorants) and the second phase likewise optionally comprises the second colorant (or plurality of colorants). When present, one or more of the first colorants present in the first phase are optionally distinct from the one or more second colorants present in the second phase. Stated in another way, the first phase may comprise at least one distinct colorant from the second phase. Multiple phases of the composition may each respectively comprise a plurality of distinct colorants. In other aspects, one or more of the distinct phases of the multiphasic nano-component may have a common colorant. The first and second phases (or additional phases) may contain one or more of the same colorants or different colorant mixtures. In certain aspects, the inventive multiphasic nano-components comprise multiple colorants.

Thus, in various aspects, the multiphasic components according to the present teachings include a first phase and at least one additional phase that is distinct from the first phase. In certain embodiments, the multiphasic nano-components are anisotropic. In certain aspects, the multiphasic components of the present disclosure include multiple distinct phases, for example three or more distinct phases. As used herein, "multiphase" or "multiphasic" means that at least two phases herein occupy separate but distinct physical spaces to form the nano-component shape. In certain embodiments, such phases are in direct contact with one another (e.g., they are not separated by a barrier and they are not emulsified or mixed to any significant degree). By the term "phase" it is meant that a portion, domain, or region of a component is chemically and/or physically distinct from another portion, domain, or region of the component, for example a phase may have one average composition distinct from another phase having a different average composition. Each respective phase optionally occupies a spatially discrete region or compartment of the nano-component. In certain aspects, each respective phase of the multiphasic component is exposed to an external environment, thus providing exposure of the respective phase surfaces of the multiphasic component to an external environment. The exposure of each respective surface of each phase provides enhanced environmental interface and optimum visibility for optical applications.

In certain aspects, the respective phases are visible to the human eye and/or to an electronic or automated sensor. In other aspects, a plurality of similar multiphasic colorant nano-components may generate a net visual effect when similar phases are grouped together to exhibit a color field (so that the individual multiphasic colorant nano-particles phases may not necessarily be discernable to the human eye). In accordance with various aspects of the present teachings, the nano-component comprises at least one colorant and at least two distinct phases, such that the respective phases occupy distinct regions or domains in the nano-component, which are visually, optically, and/or physically distinct from one another. By way of example, two similar phases may include a first polymer phase comprising a colorant (e.g., pigments, dyes, particles) and a second polymer phase comprising the same colorant at a different concentration to result in a region or domain having a different average composition, which provides a visually distinct effect. Alternately, the two phases may vary in composition and/or colorants and thus may include multiple visually distinct phases. In other aspects, the present disclosure contemplates the mixing of two phases, where one is a continuous phase and one is a discontinuous phase, which may not individually be perceived by the human eye.

Figure 1C:
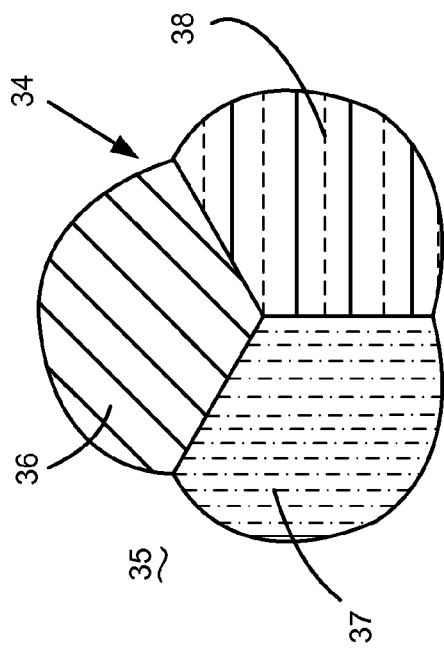
FIG. 1C is an illustration of a triphasic particle formed in accordance with certain aspects of the present disclosure.
Figure 1D:
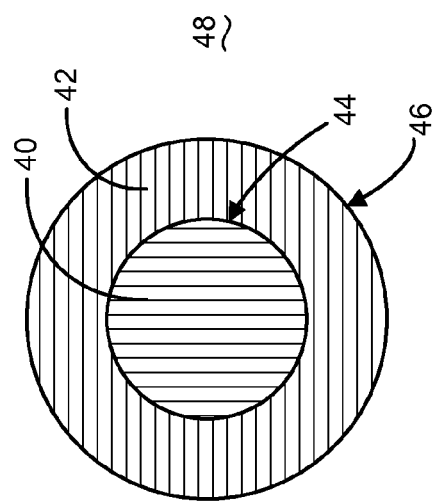
FIG. 1D is an illustration of a biphasic particle having a core-in-shell morphology formed in accordance with certain aspects of the present disclosure.
Figure 1A:
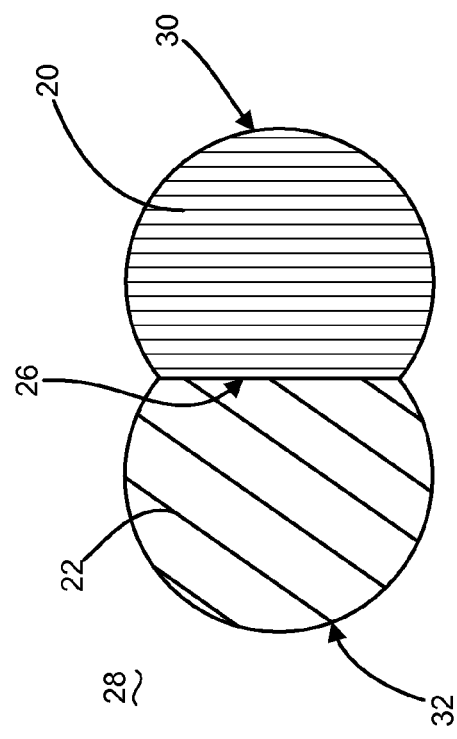
FIG. 1A is an illustration of a biphasic particle formed in accordance with certain aspects of the present disclosure.
Figure 1B:
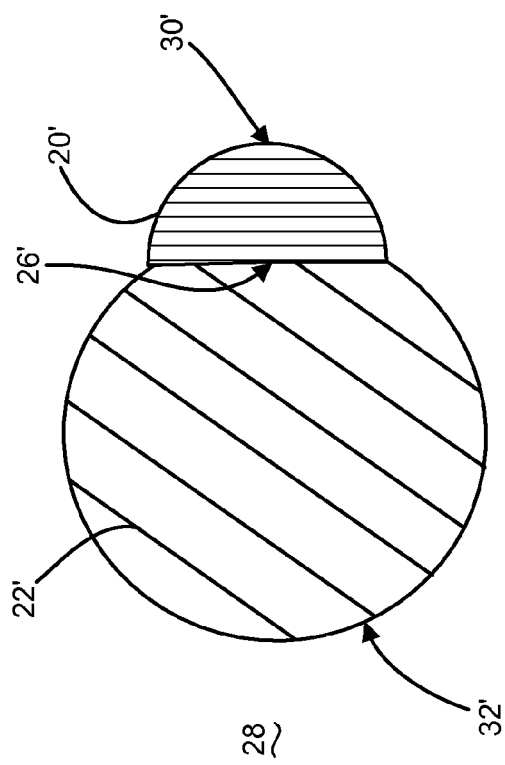
FIG. 1B is an illustration of a biphasic particle formed in accordance with certain aspects of the present disclosure.

Thus, in various aspects, the present disclosure provides multiphasic components that have a plurality of physically and/or compositionally distinct phases, such as shown in FIGS. 1A-1D. In certain aspects, the multiphasic components of the present disclosure include multiple distinct phases, for example three or more distinct phases, such as the embodiment shown in FIG. 1C. Configurations such as those shown in FIGS. 1A and 1B have three phase interfaces. In FIG. 1A, a first phase 20 and a second phase 22 share a first phase interface 26, where both the first phase 20 and second phase 22 occupy discrete spatial locations within the nano-component. First phase 20 also interacts with an external environmental medium 28 at a second phase interface 30. Lastly, the second phase 22 has a third phase interface with the medium 30 at a third phase interface 32. In FIG. 1B, a first phase 20' has a reduced surface area that is exposed to external medium 28 than the second phase 22'. However, such phases 20, 22' have a first, second, and third phase interface 26', 30', 32', alike to those in FIG. 1A.

Hence, as depicted in FIGS. 1A and 1B, the relative volume of each respective phase can vary significantly in an exemplary biphasic multi-component particle. The differences in the relative sizes between phases in FIGS. 1A and 1B are due to the differences in thermodynamic equilibria present between the materials forming the respective phases. In FIG. 1A, the first and second phases (20, 22) of a biphasic nano-component composition are approximately 50% by volume of a first phase and 50% by volume of a second phase. However, in FIG. 1B, the first phase 20' occupies approximately 80% of the multiphasic nano-component and the second phase 22' occupies the remaining 20%. As appreciated by those of skill in the art, the relative volume and/or mass of each respective phase can be selected for various applications, depending on the desired function of each respective phase. The first phase 20' has less surface area exposed to the external medium 28 in FIG. 1B, thus the second phase 22' has a greater surface area and can provide greater exposure to materials contained on the surface or in the second phase 22'. It should also be appreciated in the teachings of the present disclosure, that as the size of the component and phase becomes smaller, for example, down to the sub-micron scale, due to the increased surface-to-volume ratio, many of the characteristics of the nano-components are dominated by the structure and composition of the exposed surface.

FIG. 1C shows a triphasic nano-component 34 having three compositionally distinct phases, 36, 37, 38, each respective phase having an exposed surface to a surrounding medium 35. Three phase interfaces are defined between phases 36 and 37, 37 and 38, and 36 and 38, respectively. Further, each respective phase interfaces with the surrounding medium 35, thus defining three additional phase interfaces. In sum, the triphasic nano-component 34 includes six phase interfaces.

In another variation to be described in more detail below, the multiphasic nano-component may have a core and shell configuration, as shown in FIG. 1D. A first phase 40 is disposed inside an outer external shell formed by a second phase 42, thus forming a core region. Such a configuration only has two phase interfaces. A first phase interface 44 occurs between the first phase 40 and second phase 42 and a second phase interface 46 occurs between second phase 42 and an external medium 48. As appreciated by those of skill in the art, such core-and-shell morphologies may further comprise additional phases disposed external to or within the core formed by the first phase 40.

In each variation, a number of morphologies are possible for the multiphasic nano-components comprising a colorant. The shapes of multiphasic colorant nano-components formed in accordance with the present teachings include: spheres, rectangles, polygons, disks, ellipsoids, toroids, cones, pyramids, rods, cylinders, beads-on-a-string, and fibers. The nano-component phases in certain variations optionally have parallel alignment. In yet another embodiment of the present disclosure, the nano-component comprises multiple phases distributed within one another (continuous/discontinuous phases).

Multiphasic nanoparticles can be made of a wide variety of materials, including inorganic and organic materials. In various embodiments, at least one phase of the multiphasic colorant nano-components comprises at least one polymer, copolymer, or polymer precursor (e.g., monomer(s)), referred to herein generally as a "polymer." In certain aspects, multiple phases of the multiphasic colorant nano-components each comprise one or more polymers. In various aspects, the nano-components are formed by jetting liquid streams comprising a material optionally selected from liquid solutions, curable polymer precursors or monomers, polymer solutions, and polymer melts. Thus, each respective phase of the final nano-component product is formed from a material originating in the respective liquid streams. Specifically, each phase optionally contains polymers or polymer precursors (which upon curing form polymers), such as biodegradable or non-biodegradable polymers, biocompatible polymers, or natural polymers can be used. The nano-components can be further treated, for example by subsequent cross-linking induced by heat or actinic radiation (e.g., photochemically induced). Moreover, the cross-linking may also immobilize active materials, such as colorants, in the final product.

Thus, in certain aspects, the polymers can also be modified by chemical or physical methods after formation via electrified jetting, such as by cross-linking, heat treatment, photochemical treatment, and/or changes in the chemical or physical environment. The polymer modification can optionally occur in a select portion or region of one or more of the multiple phases, or such polymer modification can occur to different degrees, potentially resulting in different materials or materials responses, as appreciated by one of skill in the art. Such polymer modification and/or treatment provides the ability to control release kinetics of respective phases, when desired.

Specifically, polymers, such as biodegradable or non-biodegradable polymers, biocompatible polymers, or natural polymers can be used. In one aspect, the first phase of the multiphasic nano-component comprises a first polymer and the second phase comprises a second polymer that is distinct from the first polymer. Thus, in certain aspects different polymers can be used in at least two phases of the multiphasic nanoparticle composition. In certain respects, different polymers used in the different phases of the MPC permit different active ingredient release kinetics, which can be useful in designing release of the active ingredient into the environment.

In certain aspects, the phases of the MPC dissolve or disintegrate at different rates. In this regard, the dissolution rate of the respective phases impacts the release rate of the active ingredient from each phase, thus providing control over the release kinetics and concentration of active ingredient to be delivered to target regions with each respective phase of the nano-component. As referred to herein, "dissolve" refers to physical disintegration, erosion, disruption and/or dissolution of a material. The phases may dissolve or disintegrate at different rates or have different solubilities (e.g., aqueous solubility) that impact the rate of colorant or active ingredient release. Each phase comprises one or more materials that dissolve or erode upon exposure to a solvent comprising a high concentration of water or other solvents. In some variations, a phase may disintegrate into small pieces or may disintegrate to collectively form a colloid or gel. In some aspects, a phase of the MPC comprises a polymer that is insoluble or has limited solubility in water, but is dispersible in water, so that the polymer breaks down or erodes into small fragments. In other aspects, a polymer used in a phase of the MPC is insoluble in water, but swellable. In variations where a polymer does not fully break down during use, the polymer can be a water-repellant polymer or an aqueous-stable hydrophilic polymer, for example, certain types of cellulose. In various aspects, each phase of the MPC optionally comprises a combination of polymer materials.

Figure 2:
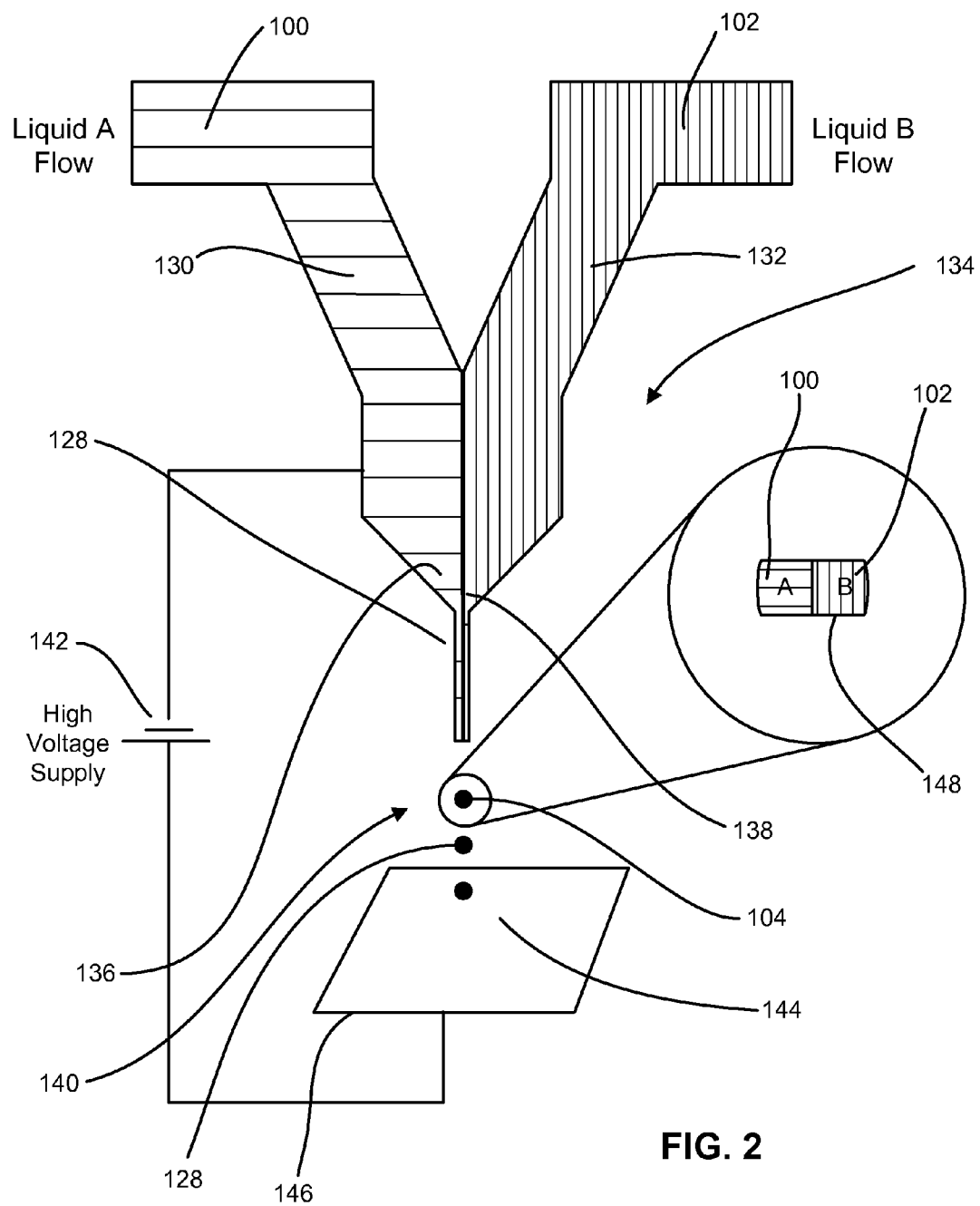
FIG. 2 shows an exemplary apparatus that forms multiphasic nanoparticle compositions according to the present disclosure by electrically jetting fluid in a side-by-side configuration to create discrete multiphasic nano-component solid particles.
Figure 3:
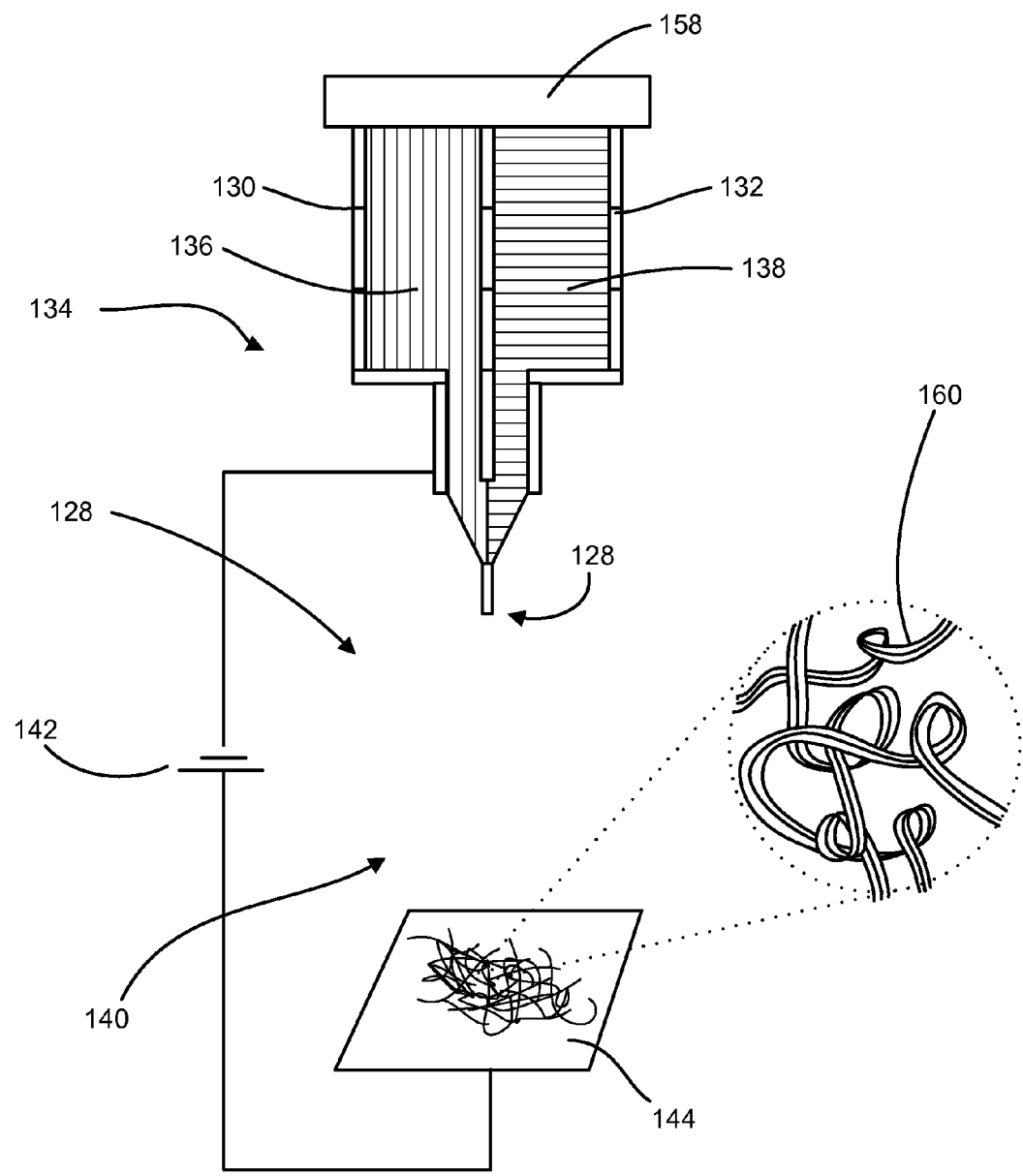
FIG. 3 shows an exemplary apparatus that forms multiphasic nanoparticle compositions, where the multiphasic nano-components are fibers.

Suitable non-limiting polymers for use in the multiphasic compositions (e.g., in Fluid A designated 100 or Fluid B designated 102 of FIG. 2 or 3) include sodium polystyrene sulfonate (PSS), polyethers, such as a polyethylene oxide (PEO), polyoxyethylene glycol or polyethylene glycol (PEG), polyethylene imine (PEI), a biodegradable polymer such as a polylactic acid, polycaprolactone, polyglycolic acid, poly(lactide-co-glycolide) polymer (PLGA), and copolymers, derivatives, and mixtures thereof. Other polymers include well known to those of skill in the art to be used in pharmaceutical, oral care, and personal care compositions, such as polyvinylpyrrolidone. Other polymers include those known in the art for use in paint compositions, ink compositions (including ink jet compositions), electronic ink compositions, and the like, including curable monomers or polymer precursors. Specifically, at least one phase can be designed to have one or more of the following properties based upon material selection: hydrophobic, positively-charged (cationic), negatively-charged (anionic), polyethylene glycol (PEG)-ylated, covered with a zwitterion, hydrophobic, superhydrophobic (for example having with water contact angles in excess of 150°), hydrophilic, superhydrophilic (for example, where the water contact angle is near or at 0°), olephobic/lipophobic, olephilic/lipophilic, and/or nanostructured, among others. In other aspects, one or more polymers or materials used within a phase may be functionalized to subsequently undergo reaction with various moieties or substances after formation of the multiphasic nano-component, to provide desired surface properties or to contain various moieties presented on the phase surface, as recognized by those of skill in the art.

Water-soluble and/or hydrophilic polymers, which are cosmetically and pharmaceutically acceptable, include cellulose ether polymers, including those selected from the group consisting of hydroxyl alkyl cellulose, including hydroxypropyl methyl cellulose (HPMC), hydroxypropyl cellulose (HPC), hydroxyethyl cellulose (HEC), methyl cellulose (MC), carboxymethyl cellulose (CMC), and mixtures thereof. Other polymers among those useful herein include polyvinylpyrrolidone, vinyl acetate, polyvinylpyrrolidone-vinyl acetate copolymers, polyvinyl alcohol (PVA), acrylates and polyacrylic acid (PAA), including polyacrylate polymer, vinylcaprolactam/sodium acrylate polymers, methacrylates, poly(acryl amide-co-acrylic acid) (PAAm-co-AA), vinyl acetate and crotonic acid copolymers, polyacrylamide, polyethylene phosphonate, polybutene phosphonate, polystyrene, polyvinylphosphonates, polyalkylenes, and carboxy vinyl polymer. The multiphasic nano-component compositions may comprise derivatives, copolymers, and further combinations of such polymers, as well.

Other polymers or water-soluble fillers among those useful herein include, without limitation, sodium alginate, carrageenan, xanthan gum, gum acacia, Arabic gum, guar gum, pullulan, agar, chitin, chitosan, pectin, karaya gum, locust bean gum, various polysaccharides; starches such as maltodextrin, amylose, corn starch, potato starch, rice starch, tapioca starch, pea starch, sweet potato starch, barley starch, wheat starch, modified starch (e.g., hydroxypropylated high amylose starch), dextrin, levan, elsinan and gluten; and proteins such as collagen, whey protein isolate, casein, milk protein, soy protein, keratin, and gelatin.

Further, non-limiting examples of water insoluble or hydrophobic polymers include cellulose acetate, cellulose nitrate, ethylene-vinyl acetate copolymers, vinyl acetate homopolymer, ethyl cellulose, butyl cellulose, isopropyl cellulose, shellac, hydrophobic silicone polymer (e.g., dimethylsilicone), polymethyl methacrylate (PMMA), cellulose acetate phthalate and natural or synthetic rubber; siloxanes, such as polydimethylsiloxane (PMDS), polymers insoluble in organic solvents, such as cellulose, polyethylene, polypropylene, polyesters, polyurethane and nylon, including copolymers, derivatives, and combinations thereof. The polymers may be crosslinked after formation by application of heat, actinic radiation or other methods of curing and treating polymers known to those of skill in the art.

In various aspects of the present disclosure, the polymers (or polymer precursors) are present in a liquid phase prior to electrified jetting or spraying at about 0.1 to about 100% by weight (on a wet basis); optionally about 1 to about 90 wt. %; optionally about 3 to about 75 wt. % of the jetting stream. While the relative concentrations of polymers in a phase can vary greatly depending on the polymer, application, and process parameters used for forming the nano-component, in certain aspects, the polymer is optionally present at about 2% to about 50% by weight; optionally from about 3% to 15% by weight of the respective phase.

In certain aspects, the multiphasic nano-components are formed by electrified jetting of materials that comprise one or more polymers, such as that disclosed by Roh et al. in "Biphasic Janus Particles With Nanoscale Anisotropy", Nature Materials, Vol. 4, pp. 759-763 (October, 2005), as well as in U.S. Publication No. 2006/0201390 and in PCT Publication No. WO 06/137936, both of which are entitled "Multi-phasic Nanoparticles" to Lahann et al. and in U.S. Provisional Patent Application Nos. 60/626,792 filed on Nov. 10, 2004 and 60/651,288 filed on Feb. 9, 2005, all of which are to Lahann. The contents of each of these respective references are hereby incorporated by reference in their respective entireties.

The structural components and the colorants typically form a single phase (exclusive of solvents, vehicles, and/or carriers) after the jetting process. The components are selected such that in certain aspects the components are thermodynamically compatible or alternately are thermodynamically incompatible with one another, depending on the desired properties of the MPC being formed. In the jetting process accompanying solvent evaporation and size reduction, even incompatible components can form a single phase by kinetic entrapment.

In yet another embodiment of the disclosure, multiphasic nano-components with selective chemical modification are provided. The nano-components are formed from one or more liquid streams that include one or more reactive components that react with a structural component (i.e., a polymer) thereby rendering a resulting surface of the multiphasic nano-components chemically modified as compared to the surface when the one or more reactive components are absent. For example, during the formation of multiphasic particles, reactive functional groups are optionally incorporated by adding appropriate components in each respective jetting solution. After jetting, the surface of the nano-component will have different functional groups at each respective phase surface corresponding to the materials present in each respective jetting solution. In some variations, the different phases are detected by optical or electronic sensors, or by fluorescent or electron microscopy, for example.

In one aspect, the first phase of the multiphasic nano-component comprises a first polymer and the second phase comprises a second polymer that is distinct from the first polymer. Thus, in certain aspects different polymers can be used in at least two phases of the multiphasic nanoparticle composition. In certain respects, different polymers used in the different phases of the MPC permit different surface properties or colorant or active ingredient release kinetics, which can be useful in designing release of the active ingredient into the environment. Further, otherwise incompatible ingredients, such as colorants or other ingredients can be stored simultaneously under stable conditions in near proximity to one another. In addition to colorants, respective phases may contain one or more active ingredients, which may otherwise be incompatible with other active ingredients. Thus, in certain embodiments, the first phase comprises materials compatible with the first colorant component and the second phase similarly has materials compatible with the second colorant component. Thus, a lipophilic, hydrophobic, or charged colorant (e.g., cationic or anionic) or active ingredient can be included in one phase of the MPC and a hydrophilic or oppositely charged colorant or active ingredient can be included in a second phase; however both the first and second colorants/active ingredients are stored in close proximity to one another and can be delivered simultaneously to a target substrate.

In certain aspects, at least one of the phases of the nano-component optionally further contains an additional additive or component, for example inorganic nanocrystals, quantum dots, biomolecules, cross-linkers, pharmaceutical compounds, molecular probes, and molecules that enable drug delivery (e.g., targeted or untargeted). In other aspects, multiple phases comprise may contain the same polymer, but differ in the additives present in each respective phase. One of the phases may contain a redox-active material, a conducting material, a charged material, or a material that is reactive to an external energy source (for example, an energy field that is controllable, such as magnetic fields, electric fields, heat or electromagnetic energy, pressure, sonication, and the like), or a material with chemical groups that can react with the surrounding environment, medium, or substrate after the nano-components are produced. Further, in certain aspects, the nano-component may contain materials that enable the generation of an electrical potential in response to application of energy or radiation, such as a light pulse, for example, or an electrical potential comparable to a typical cell potential. The nano-component may likewise have a preferential alignment towards a cell, so that a cell potential is applied. In other aspects, the nano-component optionally has a component or has one or more exposed phase surfaces that promotes self-assembly of the nano-component on a substrate by enabling the relative orientation of the nano-components on a surface or substrate to build a self-assembled architecture.

Thus, methods of forming the multiphasic nano-components comprising colorants via electrified jetting includes using liquid jets having a nanometer-sized diameter exposed to electro-hydrodynamic forces. In certain aspects, the method of making multiphasic nano-components comprises combining at least a portion of two or more liquid streams (e.g., liquid jets) together such that the two or more liquid streams contact over spatial dimensions sufficient to form a composite liquid stream having a multiphasic cone-jet of nanometer sized dimensions. In some variations, the liquid streams are electrically conductive. The composite liquid stream, and in particular the cone-jet, is exposed to a force field sufficient to solidify the composite liquid stream (i.e., the cone-jet) into a successive plurality of nano-components having multiple phases formed from materials originating in the respective first and second streams. FIG. 5. In some variations, the present methods provide the ability to form the composite liquid stream fragments into droplets that lead to forming select shapes of nano-components, such as a nano-particle, nano-sphere, or nano-rod formation, as will be described in more detail below.

As shown in FIG. 2, a "side-by-side" configuration for electrical jetting of Fluids A "100" and B "102" are combined in a jetting composite stream 128 to form a pendant droplet 104 of conducting liquid. FIG. 5 shows a detailed region of the region of the jetting composite stream 128 where the droplet forms. The drop 104 is exposed to an electric potential 142 of a few kilovolts, where the force balance between electric field and surface tension causes the meniscus of the pendent droplet to develop a conical shape, the Taylor cone 104. Above a critical point, a highly charged liquid jet 106 is ejected from an apex of the cone 104. This process has been employed by two techniques, i) electrospraying and ii) electrospinning.

In electrospraying, the ejected liquid jet 106 is eventually fragmented due to instabilities and forms a spray of droplets. Among the various applications, production of charged gas phase ions of bio-macromolecules for mass spectroscopy is the most widely used. Using polymer solutions or melts as jetting liquids, or a variety of polymers, electrospinning gives a way to develop fibers whose diameters are a few orders of magnitude smaller than those available from conventional spinning.

With reference to FIGS. 2 and 3, schematics illustrating a side-by-side electrojetting apparatus implementing a variation of the method of the invention are provided. FIG. 2 is a schematic of an exemplary electrojetting apparatus where two separate jetting liquids are combined to form a multi-biphasic nano-component particle. FIG. 3 is a schematic of an electrojetting apparatus where two jetting liquids are combined to form biphasic fibers.

In order to incorporate portions of two different streams in each side of the composite stream 128, channels 130, 132 are configured adjacent to each other (i.e., side-by-side) in nozzle 134. In some variations, channels 130, 132 are capillaries. Channels 130, 132 feed two different jetting liquid streams 136, 138 into region 140 having an electric field generated by power supply 142. Channels 130, 132 are of sufficient dimensions to allow contacting of liquids streams 136, 138 to form composite stream 144. In one variation, this electric field is generated by the potential difference between nozzle 134 and plate 146. Typically, an electric field is formed by applying a potential difference between at least two electrodes from about 0.1 kV to about 25 kV. Various configurations of plates and geometries may be used to generate the electric field as known to those of skill in the art and are contemplated by the present disclosure.

FIG. 2 illustrates the electrospraying method of forming multiphasic nano-components in which particles 148 are formed. In this variation, ejected composite jet stream 106 is fragmented due to instabilities thereby forming a spray of droplets. FIG. 3 illustrates a variation in which nano-fibers are formed when polymer solutions or melts are used as jetting liquids, where fibers 160 are obtained. In FIG. 3, a syringe pump 158 is used to drive the liquids in nozzle 134.

As schematically presented in FIGS. 2, 3, and 5, the multiphasic jet 106 which is ejected by the stable biphasic cone 104 can be either fragmented to multiphasic nano-droplets or can solidify into multiphasic nanofibers, for example. The two phases, i.e., the two jetting liquids (or solutions), are optionally compatible with each other (e.g., miscible or soluble) or in certain variations are incompatible with one another. Where the two polymer solutions are compatible with each other, a stable cone-jet forms a stable interface between the two phases. In such situations, it is believed that the process is kinetically controlled (rather than thermodynamically controlled), resulting in one phase being trapped in each side before mixing with the other phase(s).

Morphological control can be achieved with the exemplary electric jetting formation methods described herein. Therefore, composite liquid stream 128 which forms the ejected composite jet stream 106 from the pendant cone 104 can be fragmented to small droplets or sustained and elongated in the form of a continuous fiber. The size of the droplet and diameter of the fibrous jet can also be controlled. Such control is attained by changing either the material properties of jetting liquids or the working parameters of electrified jetting that breaks-up the jet stream. It should be appreciated, however, that the final morphology of the liquid jet is not always the same as those of the solid products collected on the substrates.

The shape of final products can also be controlled by a sol-gel transition process or by subsequent processing after formation by electric jetting. When electric jetting is used to form multiphasic nano-components in the form of fibers (for example, by electrospinning in FIG. 3), a sol-gel transition can be intrinsic to the process, since the jetting liquids comprise polymer solutions or polymer melts, and solvent evaporation or a temperature drop below the thermal transition temperature during the jetting acts as a sol-gel treatment step.

Figure 4:
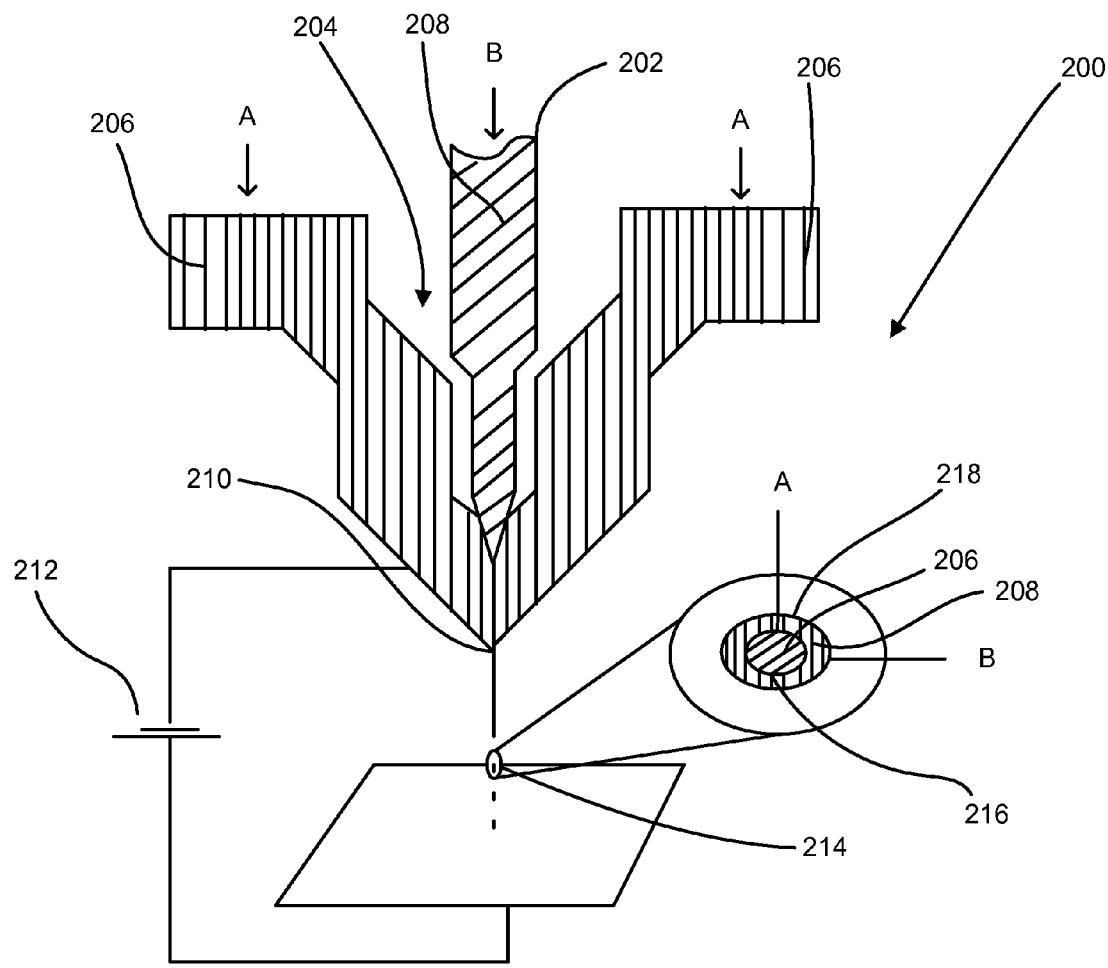
FIG. 4 shows an apparatus that forms multiphasic nanoparticle compositions in a core-and-shell morphology configuration according to certain aspects of the present disclosure by electrically jetting fluid.

In one aspect, the electrified jetting can be employed to create a shell and core morphology. As shown in FIG. 4, a core and shell structure of a multiphasic colorant nano-component can be formed by an electrified jetting apparatus 200, where an injector 202 for Fluid B is disposed within an introduction region 204 for Fluid A. As Fluids A and B (206, 208) are fed to an ejection point 210 of the jetting apparatus 200, the force balance an applied electric field from a voltage source 212 and surface tension causes the meniscus of the pendent droplet 214 to develop at the Taylor cone (FIG. 5) and to be ejected as a droplet, where Fluid A 206 is enclosed within (forms a core 216) a shell 218 of Fluid B 208.

Other methods of forming such a core and shell structures include the side-by-side type of formation method described in U.S. Publication No. 2006/0201390 and in PCT Publication No. WO 06/137936, both of which are entitled "Multiphasic Nanoparticles" to Lahann et al., where the surface tension of Fluids A and B, as well as the electric field application can be selected to promote formation of a core and shell structure.

In various aspects, the use of the electric jetting methods of the disclosure provide greater control over the morphology and design of the colorant nano-components as opposed to other methods of forming nano-components (such as sonication during liquid jetting and the like). For example, the liquid jetting in the presence of an electric field of the present disclosure permits the use of immiscible materials as the first and second phases, as well as miscible materials. The broad use of such materials is possible due to the rapidity of formation of particles and shapes when an electric field is applied. For many conventional methods of formation, the respective phases require immiscibility between the phases; however the electric jetting methods employed here do not require such immiscibility, thus resulting in a significant advantage and providing a wider range of material selection. Further, the methods of forming the multiphasic nano-components by use of side-by-side electric jetting further provide a high degree of control over the ability to create a wide variety of shapes, including fibers and the like.

In this regard, the multiphasic colorant nano-components of the present disclosure have a wide range of chemical, physical, and/or optical properties. Such multiphasic colorant nano-components can be designed to have pre-selected types and concentrations of colorants or other active ingredients. Any number of suitable colorants can be used. Moreover, the surface properties of each exposed phase of the multiphasic colorant nano-components can be tailored, as desired, to change the overall properties of the nano-components.

Figure 7:
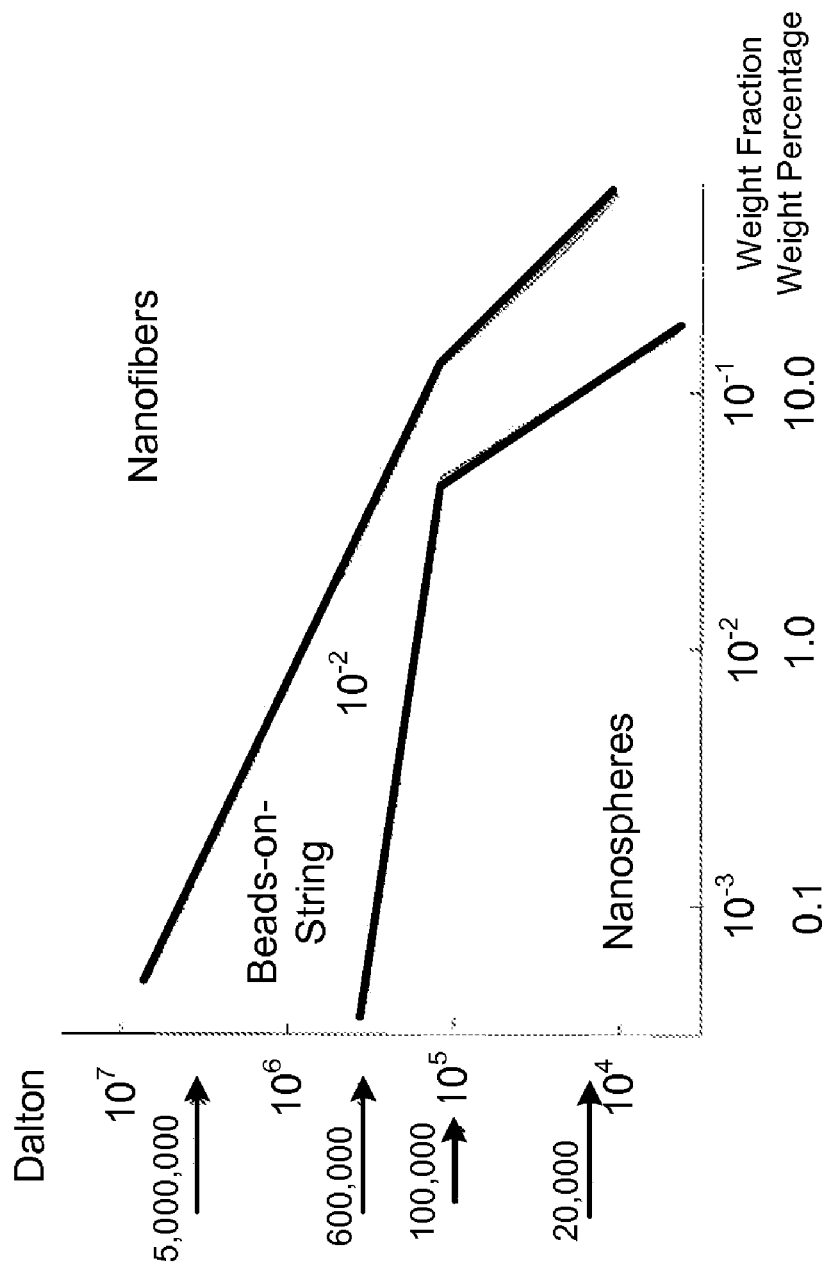
FIG. 7 is a diagram showing the relationship of molecular weight and concentration to morphology.

With regard to the operating parameters, the average size and size distributions of the droplets in electrospraying with cone-jet mode are in certain aspects related to the flow rate (pumping rate of the jetting liquids). At a fixed flow rate, the size distributions consist of one or several relatively monodisperse classes of diameters. At minimum flow rate, the modality of the distributions and diameter of the droplet itself also tend to show their minima. When the flow rate is changed, the electric field is adjusted by changing either distance or electric potential between the electrodes in order to sustain a stable cone-jet mode. Higher flow rates can be accompanied by a higher electrical field for mass balance of jetting liquids. The diameter of droplets can be reduced if solvent evaporation is incomplete (before the droplets reach the collecting substrate), so the resulting droplets are wet and flat. FIG. 7 described below shows an exemplary material system that depicts the weight average molecular weight versus concentration in determining nano-component morphology during electrified jetting formation methods.

In certain aspects, fine droplets can be produced by fragmenting the jetting liquids before they solidify. For this purpose, jetting liquids can be a very dilute polymer solution with extensional viscosity that has minimal strain hardening. However, depending on the molecular weight of the polymer, this concentration range may in certain circumstances be too low for the desired particle production. Accordingly, in some variations, an alternative is to use low molecular weight compound as the jetting liquid, where the droplets are in a liquid phase at the point of collection. The appropriate sol-gel chemistry is necessarily employed after or during the process of jetting in certain respects. In some variations, the resultant nano-component of the jetting is further treated after forming the nano-components, for example, by cross-linking, to form an insoluble network structure. The cross-linking reaction of the pre-polymer or polymer precursor can be initiated by an appropriate method (e.g., thermal initiation or UV illumination).

MPCs made in accordance with the present disclosure optionally have a wide range of optical properties. The optical properties of the MPCs are generally related to the type and concentration of colorant molecules in the respective compositions forming the phases or the optical properties of the exposed surface of one or more phases. As used herein, the term "colorant" is meant to include without limitation any material that provides an optical or visual effect, tint, or color to a material. The term is meant to include a single material or a mixture of two or more colorant materials. A red colorant emits electromagnetic radiation at a wavelength of about 625 nm to 740 nm; orange at about 590 nm to about 625 nm; yellow at about 565 nm to about 590 nm; green at about 520 nm to about 565 nm; blue or cyan at about 500 nm to about 520 nm; blue or indigo at about 435 to about 500 nm; and violet at about 380 nm to about 435 nm. A white colorant (achromatic colorant) generally reflects or emits a combination of all the colors of the visible light spectrum. A "substantially white" colorant gives the appearance of and/or is perceived as a white or grey shade, although the colorant may not exhibit true achromaticity.

Suitable colorant materials for use in accordance with the present teachings include, but are not limited to, dyes, pigments, and polymers. A "pigment," is generally an inorganic or organic, colored, white or black material that is usually substantially insoluble in solvents. A "dye," unlike a pigment, is generally soluble in a solvent or carrier. Pigments may be selected to have a particle size suitable for an application, for example, a maximum particle size that is small enough to avoid clogging of nozzles or capillaries during formation and of a smaller particle size than the nano-component dimensions. In certain aspects, the pigments have minimal deviation in particle size, i.e. have a narrow particle size distribution. Other suitable colorants include polymers, which may also form a structural component material of the MPC nano-component.

Suitable dye colorants include direct dyes (for substrates such as cotton, cellulosic and blended fibers), vat dyes (for substrates such as cotton, cellulosic and blended fibers), sulfur dyes (for substrates such as cotton and cellulosic fiber), organic pigments (for substrates such as cotton, cellulosic, blended fabrics, paper), reactive dyes (for substrates including cellulosic fiber and fabrics), disperse dyes (for synthetic fiber substrates), acid dyes (for wool, silk, paper, synthetic fibers, and leather substrates), azoic dyes (for printing inks and pigments), synthetic dyes, basic dyes (for silk, wool, and cotton substrates), fluorescent dyes, and phosphorescent dyes.

Suitable pigment colorants include by way of non-limiting example, pearlescent, metallic flake, cholesteric liquid crystal (CLC) pigments, ultramarine pigments, effect pigments, fluorescent pigments, phosphorescent pigments, inorganic pigments, carbon black pigments, natural pigments, organic pigments, mixed metal oxide pigments, iron oxide pigments, titanium dioxide pigments, organic azo pigments (such as azo lake pigments, insoluble azo pigments, condensed azo pigments, and chelate azo pigments), organic polycyclic pigments (such as phthalocyanine based pigments, anthraquinone based pigments, perylene based pigments, perinone based pigments, indigo based pigments, quinacridone based pigments, dioxazine based pigments, isoindolinone based pigments, quinophthalone based pigments, and diketopyrrolopyrrole (DPP) based pigments), dyeing lake pigments (such as lake pigments of acid or basic dyes), azine pigments; and the like. Further, suitable colorants may include surface-treated pigments.

In certain aspects, synthetic colorants include polymers, which may serve as a structural material of the nano-component, as well as a colorant. One suitable and non-limiting example is the class of poly(aryleneethynylene) (PAE) polymers, which are conjugated and stable solid polymers that can fluoresce in orange, yellow, green, and blue ranges, for example. Suitable examples of PAE fluorescent polymers include poly(p-phenylene), poly(p-phenyleneethynylene) (PPE) or poly(p-phenylenevinylene) and derivatives thereof, including those derivates having alkyl, alkyl phenyl, and alkoxy groups such as grafted PPE and dioctyl-PPE, or ternary benzothiadiazole-co-alkyne-co-alkyne substituted backbones. Other suitable conjugated polymers include polythiophene and polyaniline, by way of example.

Particularly suitable colorants for the MPCs of the present disclosure include low-molecular weight dyes, such as laser dyes, textile dyes, paint dyes and pigments, coating dyes and pigments, plastic colorants, metal colorants, ceramic colorants, fluorescent or phosphorescent dyes, fluorescent polymers, natural dyes, polymeric dyes, inorganic or organic pigments, or mixtures thereof.

Hence, a variety of colorants is known to those of skill in the art and is suitable for use in accordance with the present disclosure. By way of non-limiting example, suitable colorants include Color Index (C.I.) (published by the Society of Dyers and Colourists): C.I. Pigment Yellow 93, 95, 109, 110, 120, 128, 138, 139, 151, 154, 155, 173, 180, 185 and 193, C.I. Direct Yellow 8, 9, 11, 12, 27, 28, 29, 33, 34, 35, 37, 39, 41, 42, 44, 50, 53, 58, 59, 68, 86, 87, 93, 95, 96, 98, 100, 106, 108, 109, 110, 130, 132, 142, 144, 161, 163; C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, 227; C.I. Reactive Yellow 2, 3, 13, 14, 15, 17, 18, 23, 24, 25, 26, 27, 29, 35, 37, 41, 42; C.I. Basic Yellow 1, 2, 4, 11, 13, 14, 15, 19, 21, 23, 24, 25, 28, 29, 32, 36, 39, 40; C.I. Pigment Orange 13, 16, 34, 36, 43, 61, 63 and 71; C.I. Pigment Green 7, C.I. Pigment Red 101, 108, 122, 202, 254; C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243, 247; C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, 397; C.I. Reactive Red 3, 13, 17, 19, 21, 22, 23, 24, 29, 35, 37, 40, 41, 43, 45, 49, 55; C.I. Basic Red 12, 13, 14, 15, 18, 22, 23, 24, 25, 27, 29, 35, 36, 38, 39, 45, 46; C.I. Pigment Blue 27, 29, 15:1, 15:2, 15:3, 15:4, 15:6, 17:1; C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, 291; C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290, 326; C.I. Reactive Blue 2, 3, 5, 8, 10, 13, 14, 15, 17, 18, 19, 21, 25, 26, 27, 28, 29, 38; C.I. Basic Blue 1, 3, 5, 7, 9, 22, 26, 41, 45, 46, 47, 54, 57, 60, 62, 65, 66, 69, 71; C.I. Pigment Violet 19, 23 and 33; C.I. Direct Violet 7, 9, 47, 48, 51, 66, 90, 93, 94, 95, 98, 100, 101; C.I. Acid Violet 5 34, 43, 47, 48, 90, 103, 126; C.I. Reactive Violet 1, 3, 4, 5, 6, 7, 8, 9, 16, 17, 22, 23, 24, 26, 27, 33, 34; C.I. Basic Violet 1, 2, 3, 7, 10, 15, 16, 20, 21, 25, 27, 28, 35, 37, 39, 40, 48; C.I. Pigment Black 7; C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, 199; C.I. Acid Black 7, 24, 29, 48, 52:1, 172; C.I. Reactive Black 4, 5, 8, 14, 21, 23, 26, 31, 32, 34; C.I. Basic Black 7, and 8; and C.I. Pigment White 4, C.I. Pigment White 18, and C.I. Pigment White 21.

In ink applications, a colorant set that provides full-color complement for printing images, includes colorants for cyan, magenta, yellow, and black or "key" (CMYK). For example, C.I. Pigment Yellow 138, 151, 154, 180 and 185 may be used as the yellow colorant in ink applications. Other examples of exemplary yellow dyes suitable for use in the MPCs of the present disclosure include aryl- and heterylazo dyes having phenols, naphthols, anilines, pyrazolones, pyridones or open chain active methylene compounds as coupling components, azomethine dyes having open active chain methylene compounds as coupling components, methine dyes such as benzylidene dye and monomethine oxonol dye, and quinone dyes such as naphthoquinone dye and anthraquinone dye. Other examples of the yellow dye employable herein include quinophthalone dyes, nitro-nitroso dyes, acridine dyes, and acridinone dyes. Such dyes typically exhibit yellow color when the chromophore undergoes partial dissociation. The counter cation in this case may be an inorganic cation such as alkaline metal ion and ammonium ion or an organic cation such as pyridinium ion and quaternary ammonium salt ion, or a polymer cation having such cations as partial structure.

Examples of magenta colorants, suitable for use in MPCs used in ink applications, include C.I. Pigment Red 122 and 202, 254, C.I. Pigment Violet 19; aryl- and heterylazo dyes having phenols, naphthols or anilines as coupling components, azomethine dyes having pyrazolones or pyrazolotriazoles as coupling components, methine dyes such as arylidene dye, styryl dye, melocyanine dye and oxonol dye, carbonium dyes such as diphenylmethane dye, triphenylmethane dye and xanthene dye, quinone-based dyes such as naphthoquinone, anthraquinone and anthrapyridone, and condensed polycyclic dyes such as dioxazine dye. Again, such dyes typically exhibit magenta color when the chromophore undergoes partial dissociation. The counter cation in this case may be an inorganic cation such as alkaline metal ion and ammonium ion or an organic cation such as pyridinium ion and quaternary ammonium salt ion, or a polymeric cation having such cations as partial structure.

In yet other examples, cyan colorants for the MPCs are optionally selected from C.I. Pigment Blue 15; azomethine dyes such as indoaniline dye and indophenol dye, polymethine dyes such as cyanine dye, oxonol dye and melocyanine dye, carbonium dyes such as diphenylmethane dye, triphenylmethane dye and xanthene dye, phthalocyanine dyes, anthraquinone dyes, aryl- and heteryl azo dyes having phenols, napthols or anilines as coupling components, and indigo-thioindigo dyes. These dyes typically exhibit cyan color when the chromophore undergoes partial dissociation. The counter cation in this case may be an inorganic cation such as alkaline metal ion and ammonium ion or an organic cation such as pyridinium ion and quaternary ammonium salt ion, or a polymeric cation having such cations as partial structure.

For black ("K") colorants suitable for use in ink applications, an acidic or neutral pigment of C.I. Pigment Black 7, carbon black, magnetite, and aniline black and/or polyazo dye are all suitable options.

In certain embodiments, colorants are optionally selected which are approved for incorporation into a food, drug, or cosmetic by a regulatory agency, such as FD&C or D&C pigments and dyes approved by the Federal Drug Administration (FDA) for use in the United States. Food-safe and/or cosmetically acceptable colorants among those useful herein include FD&C Red No. 3 (sodium salt of tetraiodofluorescein), Food Red 17, disodium salt of 6-hydroxy-5-{(2-methoxy-5-methyl-4-sulphophenyl)azo}-2-naphthalenesulfonic acid, Food Yellow 13, sodium salt of a mixture of the mono and disulphonic acids of quinophtalone or 2-(2-quinolyl)indanedione, FD&C Yellow No. 5 (sodium salt of 4-p-sulfophenylazo-1-p-sulfophenyl-5-hydroxypyrazole-3 carboxylic acid), FD&C Yellow No. 6 (sodium salt of p-sulfophenylazo-B-naphtol-6-monosulfonate), FD&C Green No. 3 (disodium salt of 4-{[4-(N-ethyl-p-sulfobenzylamino)-phenyl]-(4-hydroxy-2-sulfoniumphenyl)-methylene}-[1-(N-ethyl-N-p-sulfobenzyl)-Δ-3,5-cyclohexadienimine], FD&C Blue No. 1 (disodium salt of dibenzyldiethyl-diaminotriphenylcarbinol trisulfonic acid anhydrite), FD&C Blue No. 2 (sodium salt of disulfonic acid of indigotin), and mixtures thereof in various proportions. In certain aspects, the colorant comprises a cosmetically and/or pharmaceutically acceptable water insoluble inorganic pigment, such as titanium dioxide, chromium oxide green, phthalocyanine green, ultramarine blue, ferric oxide, or a water insoluble dye lake. In certain embodiments, dye lakes include calcium or aluminum salts of an FD&C dye such as FD&C Green #1 lake, FD&C Blue #2 lake, D&C Red #30 lake and FD&C # Yellow 15 lake. In yet other embodiments, a white colorant is used, for example titanium dioxide ($TiO_2$), titanium dioxide coated mica, a mineral, or a clay.

The amount of colorant included in each respective phase of the MPCs will depend on the selection of the colorant and its properties as well as the desired hue, saturation, and value.

In certain aspects, a sufficient amount of colorant is included to attain the desired color density or optical effect in the respective phase of the MPC. In certain aspects, the colorant is present in the respective phase at optionally less than or equal to about 95 wt. %; optionally less than or equal to about 85 wt. %; optionally less than or equal to about 75 wt. %; optionally less than or equal to about 65 wt. %; optionally less than or equal to about 55 wt. %; optionally less than or equal to about 50 wt. %; less than or equal to about 45 wt. %; optionally less than or equal to about 40 wt. %; optionally less than or equal to about 35 wt. %; optionally less than or equal to about 30 wt. %; optionally less than or equal to about 25 wt. %; optionally less than or equal to about 20 wt. %; optionally less than or equal to about 15 wt. %; optionally less than or equal to about 10 wt. %; optionally less than or equal to about 5 wt. %; optionally less than or equal to about 3 wt. %; optionally less than or equal to about 1 wt. %; and in certain aspects less than or equal to about 0.5 wt. %. In certain aspects, each respective phase in the nano-component comprises about 0.1 to about 95% by weight of colorant of the total phase composition; optionally about 0.5 to about 50 wt. %; optionally about 1 to about 25 wt. %, and in certain aspects, optionally about 3 to about 15 wt. %.

Moreover, in accordance with yet other aspects of the present disclosure, the surface properties of each phase of the MPC can be tailored in a manner that provides control over the overall properties of the MPCs. By variation the concentrations of colorants in the phases of the MPCs and by including colorants for each of the primary colors, MPCs of virtually any color can be obtained. Moreover, the MPCs in accordance with the present teachings produce additional optical effects such as sheen, angular color variations, and translucence, if desired.

In a variation of this embodiment, side-by-side dual capillaries can be used for the electrified jetting process to create biphasic colorants. Through each jetting capillary (nozzle), portions of two chemically distinct jetting liquids are combined in a composite stream fed into a region having a force field present, and in particular an electric field. Each of the two jetting liquids can be composed of similar components to those typically used in one-phasic nano-component production. In order to induce distinct characteristics in each phase, different dopants (additives and optionally colorants) are incorporated for each jetting liquid. The structural components, the polymer or polymer solution, for each liquid stream may be the same or different. In a further refinement, alternate colorants may have a core-shell geometry. In another variation, the colorants are set into their final geometry by a post-treatment step, such as thermal annealing or treatment with light or other forms of energy.

In another aspect of the present disclosure, the multiphasic nano-component comprises three different phases created by using three jetting liquids that are fed through three jetting capillaries. Although not depicted here, the principles that apply to dual capillary electrified jetting shown in FIGS. 2-4 are equally applicable to a set-up with three of more capillaries (liquid jet streams) that are combined to form a composite stream. For example, the geometry of the three capillaries can be varied in several different ways, such as arranging the capillaries in a triangular arrangement. In this case, three different material systems (which may contain dopant mixtures) can be incorporated in each of the three phases of the nano-component, all of which are exposed to the periphery of the colorants. In another variation, the capillary geometry is created by inserting side-by-side dual capillaries into an outer capillary. This combined geometry of biphasic and core-shell jetting produces triphasic colorants with interesting internal materials distribution. For example, if the two inner (core) liquids are used for inducement of colorants and additives, the resulting colorants behave similar to biphasic colorants. The third outer (shell) liquids can be used for an inducement of encapsulating layer, which can protect colorants in an internal core region from exposure to any incompatible media and/or can enhance the suspending capability of the MPCs by controlling the surface characteristics of exposed surfaces of the MPCs.

As noted previously, the present disclosure contemplates multiphasic colorant nano-components having more than three phases. Extension of the biphasic and triphasic electrified jetting techniques described above uses more than three jetting capillaries for employing more than three phases into the colorants. In certain aspects, in order to ensure that all the jetting liquids are involved in the production of every colorant, in other words, to prevent a situation where each MPC is composed of a different combination of phases, the geometry of the capillaries is configured such that the jet is ejected out from the junction point of all the jetting liquid phases in the Taylor cone.

In other variations of the present disclosure, the MPCs have non-spherical shapes. As set forth above, the electrified jetting process is governed by complex parameter windows. Variation of these parameters, allows creating a cone-jet mode that is appropriate for the multi-capillary jetting, among various jetting modes. Variation of these parameters, also allows control of the shape of the resulting nano-components.

In various aspects, when polymer solutions are employed as jetting liquids, roughly three different regimes can be designated for electrified jetting, generally depending on the polymer concentrations. FIG. 7 shows an example how the morphology can be controlled by changing two independent solution parameters (concentration and molecular weight of the structural polymer) for one exemplary material system. As shown in FIG. 7, for example, the two extreme concentration regions, i.e. very dilute concentration (below overlap concentration, c*) and fairly concentrated concentration (above c*), jetting can be categorized as electrospraying and electrospinning, respectively. Very dilute polymer solutions are similar to low molecular weight liquids (usually solvents) in terms of viscoelasticity. The capillary break-up of the jet occurs easily to form droplets, so as to produce unimolecular macromolecule ions as in the case of application of mass spectrometry. However, at higher concentrations, the capillary break-up of the jet is difficult to achieve due to the strain hardening of the polymer solution in elongational flow. During this persistence, solvent evaporation is accelerated by the elongation of the jet and eventually the jet solidifies as a fine fiber. In this case, use of higher concentrations polymers and/or using larger molecules make viscosity of the jetting solution higher so that the resulting morphology becomes more fibrous.

In another embodiment of the present disclosure, a method of forming multiphasic beaded fibers is provided. It is observed that at intermediate concentrations, polymer solutions can form beaded fibers when electro-jetted. In the present embodiment, two or more streams of polymer solutions are combined together at a nozzle such that the two or more streams contact over spatial dimensions sufficient to form a composite liquid stream having a cross-section of nanometer sized dimensions. At least a portion of the composite liquid stream is exposed to an electric field sufficient to fragment the composite liquid stream into beaded fibers. Sometimes the beaded fiber structure is referred to as "beads-on-string" morphology. Poly(ethylene oxide) (PEO) solutions are exemplary solutions showing this morphology. This unique structure is believed to be the result of competition between the elongational force of the electric field and the surface tension of the jetting liquid. Since the size and shape of the beads and string can be controlled by adjusting various liquid parameters and operating parameters. Viscosity, charge density, and surface tension of the jetting solutions are factors affecting this morphology. Viscosity and surface tension of solutions are changed by solution parameters such as the molecular weight of polymer, concentration, and addition of other components such as co-solvents and surfactants. Charge density can be controlled by the addition of doping agents (i.e. ionizing salt) and operational parameters such as electrical potentials and neutralizing ion generation.

Thus, for the same or similar jetting liquids, use of different operating parameters also controls the resulting MPC morphology. The possible morphology of the MPCs formed in accordance with the present disclosure includes shapes of nano or microscale selected from the group consisting of: spheres, rectangles, polygons, disks, ellipsoids, toroids, cones, pyramids, rods, cylinders, beads-on-a-string, and fibers.

Figure 6:
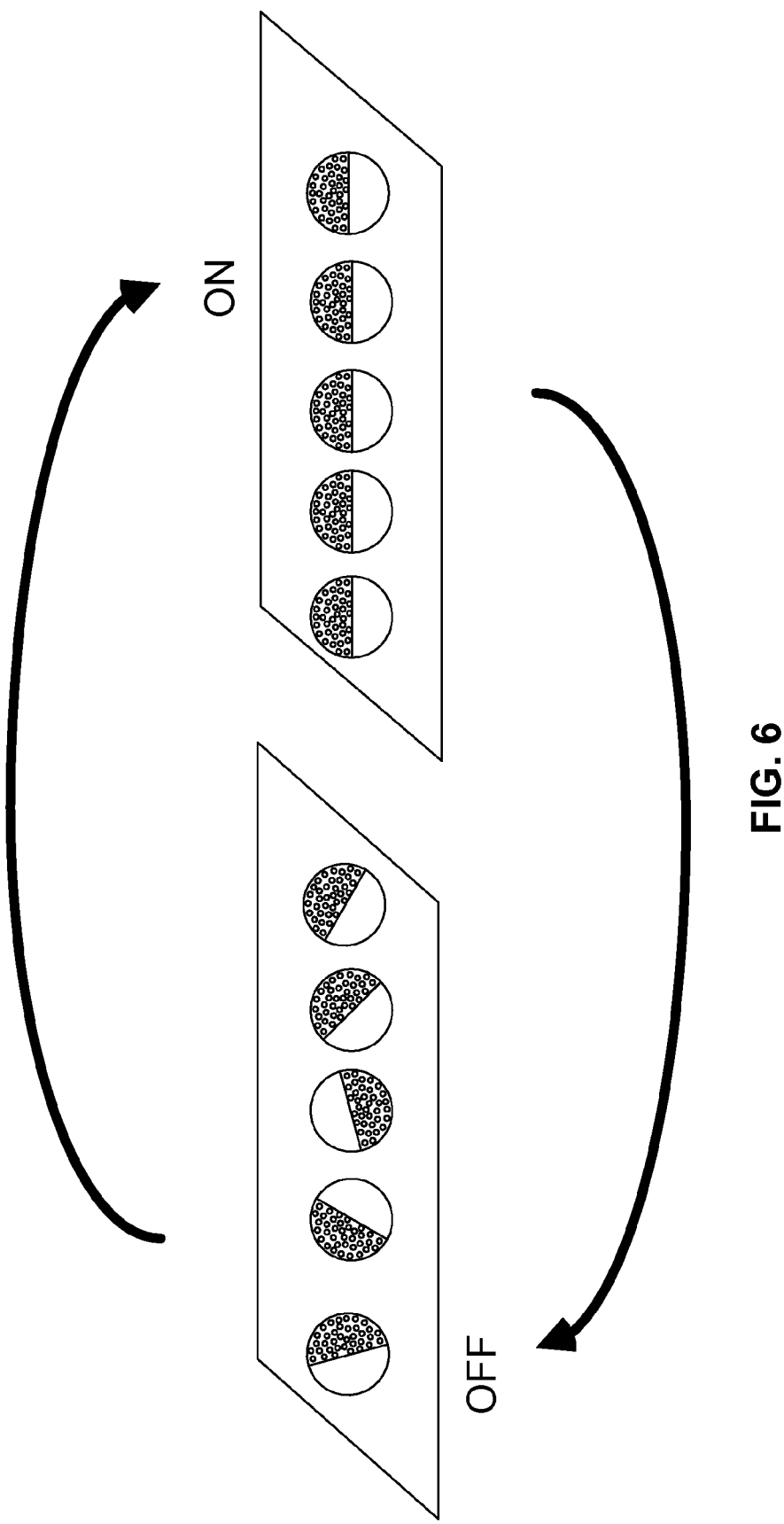
FIG. 6 is a schematic illustrating the functioning of a display based on biphasic monolayers.

The MPCs of the present teachings are particularly suitable for use as pixels in electronic display applications. Electronic displays are created by controlling the relative orientation of MPCs to the surface and to each other. The change in orientation is due to the influence of a controllable, external force field. Thus, in certain aspects, multiphasic nano-components have at least one phase which comprises a material or component that is reactive to a controllable external force field, such as electric fields, magnetic fields, pressure, sonication, light, and the like. As shown in FIG. 6, in response to the switching of the field, re-orientation of at least a part of the MPCs is observed, which results in a change in optical properties of the display pixel. Each pixel consists of at least one MPC formed in accordance with the present teachings. With such a technology, changes in the surface properties can be amplified to induce changes in color, as it is needed for advanced color displays.

In FIGS. 9A and 9B, another application for MPCs is illustrated. A plurality of anisotropic MPCs 250 each have a first phase 252 and a visually or optically distinct second phase 254. The MPCs 250 have a dipole moment (shown by the arrow), for example by including a charged moiety or species in the first phase 252 (or by treating the surface of the first phase 252 to have a charge). The plurality of MPCs 250 is disposed on a surface of a substrate 260. The substrate 260 is in electrical communication with an EMF source 262, which establishes an electrical potential (in FIG. 9A a positive charge along the substrate 260). In FIG. 9A, the second phase 254 is exposed along the substrate surface 260 and exhibits the colorants contained in the second phase 254. In FIG. 9B, the polarity of charge of the substrate 260 is reversed by reversing the polarity of the EMF source 262. Thus, in FIG. 9B, the substrate 260 has a negative charge and the second phase 254 is oriented towards the charged substrate surface, while the repelled first phase 252 is exhibited along the surface. Thus, in a variety of applications, anisotropic or visually distinct MPCs are used to modify the appearance of an object by controlling the relative orientation of the MPCs to the surface of a substrate. For example, the control of the orientation is achievable by switching controllable external fields, like electrical fields or magnetic fields. Where the MPCs are used in such applications, the nano-components are formed with different phases having charged components or a distribution of magnetic elements. In another aspect, the present teachings contemplate using light to activate the dipole moment of the MPC by inducing temporary charge transport from one phase of the MPC to another phase.

In still another aspect of the present disclosure, the anisotropic MPCs may also be used to generate one-dimensional (1D), two-dimensional (2D), or three-dimensional (3D) structures. In certain aspects, one or more phases of the MPCs have properties that enable self-assembly of the plurality of particles in a desired and preselected manner or orientation. In certain aspects, at least one of the first phase and/or second phase comprises a component and/or has an exposed surface which promotes self-assembly of the MPCs on a substrate to form a dimensioned structure or architecture. Such dimensioned structures can optionally be integrated in layered shell structures, films, or castings. Thus, the colorant nano-components are optionally assembled in a manner that provides control over the orientation of such molecules to form a desired architecture, for example, by including moieties that have polarity or charge (to form an induced charge-charge/dipole moment). In certain aspects, a first phase may have a moiety with a first charge and a second phase may have a moiety with a second charge opposite to the first charge, so that the orientation of molecules can be controlled in multiple directions to provide control over multiple dimensions of optical characteristics. In certain aspects, a first exposed phase surface may be treated to provide a polar surface, to have particular physical or chemical characteristics, for example, the exposed surface may be chemically modified with ligands or molecules to interact with the environment to drive self-assembly in a preselected manner. Another suitable embodiment employs amphiphilicity, which can be provided by surface modification of exposed phases or inclusion of appropriate components in each respective phase to provide a hydrophobic-hydrophilic dipole in respective distinct phases to enable self-assembly. Such amphiphilic MPCs will form various self-assembly structures in different interfaces. As can be appreciated, the self-assembled MPCs may include a variety of distinct different MPC components. Furthermore, pluralities of distinct colorant nano-components can be applied concurrently or may be applied sequentially with one another, for example, in a layer-by-layer assembly mode. In other aspects, an optical or visual gradient or pre-designated pattern can be formed by controlling the relative properties, e.g., polarity and/or charge, of the phases of a plurality of MPC particles.

In certain aspects, the MPCs of the present disclosure comprise colorants including low-molecular weight dyes. Many paints include either inorganic pigments or polymeric dyes as colorant. Because inorganic pigments have limited brightness and in certain applications may be less effective, replacements are of commercial interest. Low-molecular weight dyes are often discussed as replacement candidates because of their enhanced brightness and wide availability. However, low molecular weight dyes have high mobility and often result in leaching of the dye. Polymeric versions of these dyes are therefore often used despite the potentially higher cost sometimes associated with these dyes. In accordance with the present teachings, MPCs provide a simple way of manufacturing pigments of organic dyes with high brightness and high color density without the disadvantage of dye mobility, because the dye is trapped in one or more phases of the MPC and is protected from interaction with the surrounding environment preventing or minimizing leaching or inactivation of the colorant. Moreover, a wide range of colors and color effects can be achieved by simply combining one or more dye additives in each phase of the MPCs.

In certain aspects, the MPC colorants are used in ink compositions, such as ink jet compositions. By way of example, ink compositions can be used in a variety of printing processes, such as indirect and direct thermal transfer, ink jet, laser, impact, dot matrix, lithography, screen printing, top coats, and the like. Conventional solvent-based and/or water-based coatings, primers, and inks typically use thermal energy to evaporate volatile components and to cure, dry, or harden on the substrate. However, other suitable inks include radiant energy curable inks that undergo crosslinking in the presence of certain types of radiation, e.g., ultraviolet or electron beam energy, to form hardened ink without the need for external heat application. Such compositions are well known to those of skill in the art. MPCs formed in accordance with the present disclosure can be suspended in such ink compositions and used via traditional printing methods, such as in ink jet printing.

MPCs can also be used in paint materials, by way of example, including oil-based paint, as well as water-based or latex paints. Paints typically include a colorant, a vehicle or solvent, and a binder material, such a synthetic or natural polymer resin, like acrylic, polyurethanes, polyesters, melamine resins, epoxy resins, or oil resins, as are well know in the art.

In certain aspects, white colorants are used in white, opaque paint applications in lieu of white pigments (e.g., $TiO_2$). In one aspect, MPC exhibiting white color are made of purely organic materials rather than inorganic materials, prepared by the methods described above. A substantially white color (low density) is generated by combining three or more organic dyes in a single MPC, instead of using heavy and abrasive inorganic $TiO_2$ particles. In certain aspects, the dyes may be a combination of primary colors. These dyes can be either mixed together in a single phase MPC or incorporated in each respective phase of an MPC. Thus, multiphasic nano-component colorants optionally include a first phase, a second phase, and a third phase, where the first phase comprises a first dye, the second phase comprises a second dye, and the third phase comprises a third dye. In certain aspects, producing the multiphasic nano-component colorant that emits a substantially white color includes selecting the first dye to exhibit a red or orange color, the second dye to exhibit a blue, cyan, indigo, or violet color, and the third dye to exhibit a yellow or green color. For example, triphasic colorants include fluorescent dyes that have an emission wavelength range of three additive primary colors (e.g., blue, green and red). In this example, each phase includes a single color dye or colorant. When these colorants are illuminated with a fluorescent lamp, the three dyes in each phase emit their pre-selected colors and the additive primary colors produce white-colored light.

In yet other aspects, the present disclosure provides enhanced dispersions of pigments in conductive printing systems, such as electronic paper applications. The fabrication of efficient conductive inks has been a challenge in the past. One of the major challenges associated with conductive inks consisting of hybrid systems of metal particles and polymeric binders is maintaining the homogenous dispersion of the metal phases in the ink. Often charged pigment particles, such as titanium dioxide, are also employed in binders or carrier mediums for electronic inks. In addition, packing and overlap of the inorganic additives is believed to be very important for performance. However, in accordance with the present teachings, MPCs can be made and used to enhance the dispersion and the relative overlap of metal particles in binder systems by improving the compatibility between inorganic and organic components. In addition, higher loading of inorganic components can be reached in MPCs prepared in accordance with the present disclosure.

As set forth above, a number of additives, in addition to colorants, may be included in the various phases of the nano-components of the disclosure. Therefore, such additives must also be included in one or more of the liquid streams used to form the nano-objects. In one variation, quantum dots which have specific electronic, magnetic, optical or biomedical properties on only one side of a nano-sphere or nanofiber may be incorporated. In addition, one of the most attractive features of this system is relatively low cost and ease of production for this multifunctionality. Quantum dots are emerging new materials for biological labeling and are rapidly substituting traditional organic colorants and fluorescent proteins due to their unique characteristics such as high luminescence and long stability. These quantum dots can be encapsulated in or selectively attached to the multiphasic component. Probing and sensing can be accomplished by combining the multiphasic character and an appropriate physical mechanism (e.g. fluorescent resonance energy-transfer or "FRET"). For sensors or probes based on FRET, size control and interface design between the donor and acceptor considering the Foster distance are important design criteria.

In another embodiment of the present disclosure, multiphasic nano-spheres made by the methods set forth above are used as building blocks for hyper structures. For example, a monolayer of biphasic nano-spheres can act as a switchable surface which responds to the application of an external force field (electric or magnetic). As noted above, FIGS. 6 and 9A-9B illustrate exemplary embodiments where the MPCs can be used in the functioning of a display based on biphasic monolayers. In FIG. 6, various switchable nano-components system configurations are contemplated. In one embodiment, one phase of the nano-component is loaded with magnetic particles thereby creating a structure that is switchable with a magnetic field. In a second embodiment, electron donors are included in one phase and electron acceptors in a second phase to produce a dipole moment which may be switched with an electric field. In each of these variations, a device having a display may be formed by incorporating a suitable colorant in each phase. Therefore, for example if triphasic nano-components are utilized with each phase having a colorant for one of the three primary colors, a display incorporating such a triphasic nano-component can attain nearly every color desired for optical displays in electronic devices, for example. Notably, the present teachings also contemplate controllable fields that provide gradients of energy, thus providing greater spatial control over the orientation of MPCs, such that the field is not limited to those that "switch" on and off or reverse polarity, but rather may provide relatively greater amounts of energy in an exemplary system to impact the relative orientation of the MPC particle, as desired. The components which are reactive to the external controllable field in the MPC may likewise be disposed within the MPC in concentration gradients that correspond to the desired orientation based on the applied gradients of external energy fields. In this manner, even greater control over the orientation of an anisotropic MPC with respect to the substrate is provided.

In another embodiment of the present disclosure, a method of making multi-component polymer mixtures of electron donors and acceptors is provided. Analogous bulk heterojunctions often have several limitations. In the bulk materials, some regions made by random blending are too large for excitons to diffuse to the interface, and carrier phases are often interrupted before they reach the electrode. The nano-fibers of the present embodiment in one variation are biphasic. These nano-fibers have enhanced generations of heterojunctions between electron donors and acceptors as compared to conventional blending systems. Theoretically almost every exciton generated by both phase can reach the interface before recombining. Accordingly, the heterojunction interfaces realized by the biphasic nano-fibers of this embodiment improve the exciton-splitting process. In contrast, our biphasic nano-fibers have a controllable phase dimension, whose diameter can go down to a scale on the order of tens of nanometers. Theoretically almost every exciton generated by both phases can meet the interface prior to recombining. These pseudo-molecular level heterojunction interfaces realized by the biphasic configuration of nano-fibers improve the exciton-splitting process and efficiency of the heterojunction. Additionally, since each phase forms a one-dimensional object, each acts as charge carrier, uninterrupted by the other until it contacts the electrode.

In still another aspect of the present disclosure, donor/acceptor structures with a biphasic architecture are provided. In this embodiment, inorganic nanoparticles are incorporated as photoactive carriers. These inorganic nano-particles are used because of their electrical conductivity (generally required for efficient charge separation). Moreover, these materials have electrical and optical properties that can be adjusted by varying the particle size and form densely packed layers. Finally, such materials are environmentally more stable than many colorants or proteins.

Examples of useful inorganic materials include CdTe and CdS nano-particles. These materials have been shown to be an excellent source of photo-potential and used in solar cells. Moreover, these junctions exhibit one of the highest photo-potentials observed for photoactive thin films. Because the energy of the valence and conduction bands in nano-particles can be controlled by varying their diameter, one can further increase the photo-potential by selecting CdS and CdTe nano-particles with optimal position of energy levels with respect to each other. The optical and electronic properties of CdTe and CdS nano-particles can be changed gradually by varying their diameter. As the particle size decreases, the energy gap between the top of the valence band ("VB") and the bottom of the conduction band ("CB") increases, which is termed the quantum size effect. The ability to vary the relative position of the CB and VB of CdTe and CdS enables desirable maximization of charge separation in the biphasic nano-components. By way of example, such nano-components can be formed in accordance with present disclosure by preparing aqueous solutions of CdTe and CdS nano-crystals capped with thioglycolic acid or citrate ions.

In still another embodiment of the present disclosure, the anisotropic nano-component particles may also be integrated in layered shell structures, films, or castings. This is useful to generate two or three dimensional architecture. Moreover, a graded profile of conduction band energies which are formed by known layer-by-layer techniques (LBL). Such layered shell structures, films or castings may enable withdrawal of electrons from the interface with polymers to prevent charge recombination. Two dimensional films of semiconductor nanoparticles with properly positioned highest occupied molecular orbit (HOMO) and lowest unoccupied molecular orbit (LUMO) to drive interfacial photogenerated charge separation may be formed in this manner. Examples of useful systems exhibiting this phenomenon are CdS and CdTe due to desirable positioning of their energy spectra.

The following examples illustrate the various embodiments of the present disclosure. Those skilled in the art will recognize many variations that are within the spirit of the present disclosure and scope of the claims.

EXAMPLE 1

Biphasic Jetting

The experimental setup for the present experiment conforms to that of FIG. 3. Two jetting liquids are fed using a dual syringe applicator assembly (FibriJet® SA-0100, Micromedics, Inc., MN, USA). In this setup, two 1 ml syringes are controlled by one syringe pump. Each syringe is filled with separate jetting solutions. These two syringes are connected to a dual channel tip (FibriJet® SA-0105, Micromedics, Inc., MN, USA) which has a dual cannula with a dimension of 26 gauge and 3 inch length. These dual cannula or capillaries are covered with a transparent plastic tube that ties these two capillaries in side-by-side fashion. In order to avoid the capillary pressure caused by the groove between the two round shape cannula and create a stable biphasic pendent droplet from the side-by-side capillary setup, the tip end level is made even by the sharp cutting of the two capillaries and the plastic tube.

In this example, ideal conditions for biphasic jetting are considered. Specifically, the material properties for each liquid are similar. Compatibility between the two jetting solutions is necessary to achieve a stable interface between the two phases, and basic components (i.e. polymer and solvent) need to be the same. However, each side includes a different contrasting component to create an identifiable characteristic (e.g., fluorescent dyes for confocal microscopy or molecules with different electron density for TEM), which must be maintained in each phase throughout the process. Diffusion of these contrasting components from one phase to the other must be avoided until the point of solidification. In line with the above mentioned objectives, mixtures of PEO and macromolecular fluorescent dye dissolved in water are selected for each side of jetting solution. PEO (average molecular weight 600,000), fluorescein isothiocyanate-dextran (FITC-Dextran, average molecular weight 250,000), and Rhodamine B-dextran (Rho-Dextran, average molecular weight 70,000) are purchased from Aldrich Co. (USA). Jetting is performed with solutions which are composed of 3% of PEO and 0.5% of each fluorescent-dextran by weight for each side of the jetting solution. 8 kV of electric potential is applied between 25 cm separation of the electrodes. A glass slide is covered with aluminum foil, except about 80% of the surface of one face, and the jetting is performed on the open face of the glass slide. Electrodes are connected directly to the side-by-side capillaries and the aluminum foil covering the glass slide substrate. Flow rate is 0.1 ml/hour for each side. Conformal microscopy shows the resulting beads-on-string morphology. (Model. SP2 CLSM manufactured by Leica, USA). Ar/ArKr laser (wavelength 488 nm) and GreNe laser (wavelength 543 nm) are used to excite FITC and Rhodamine B respectively. The absorption (emission) wavelength windows for FITC and Rhodamine B are set to 508 to about 523 nm and 650 to about 750 nm respectively.

EXAMPLE 2

Selective Chemical Modification

Figure 8:
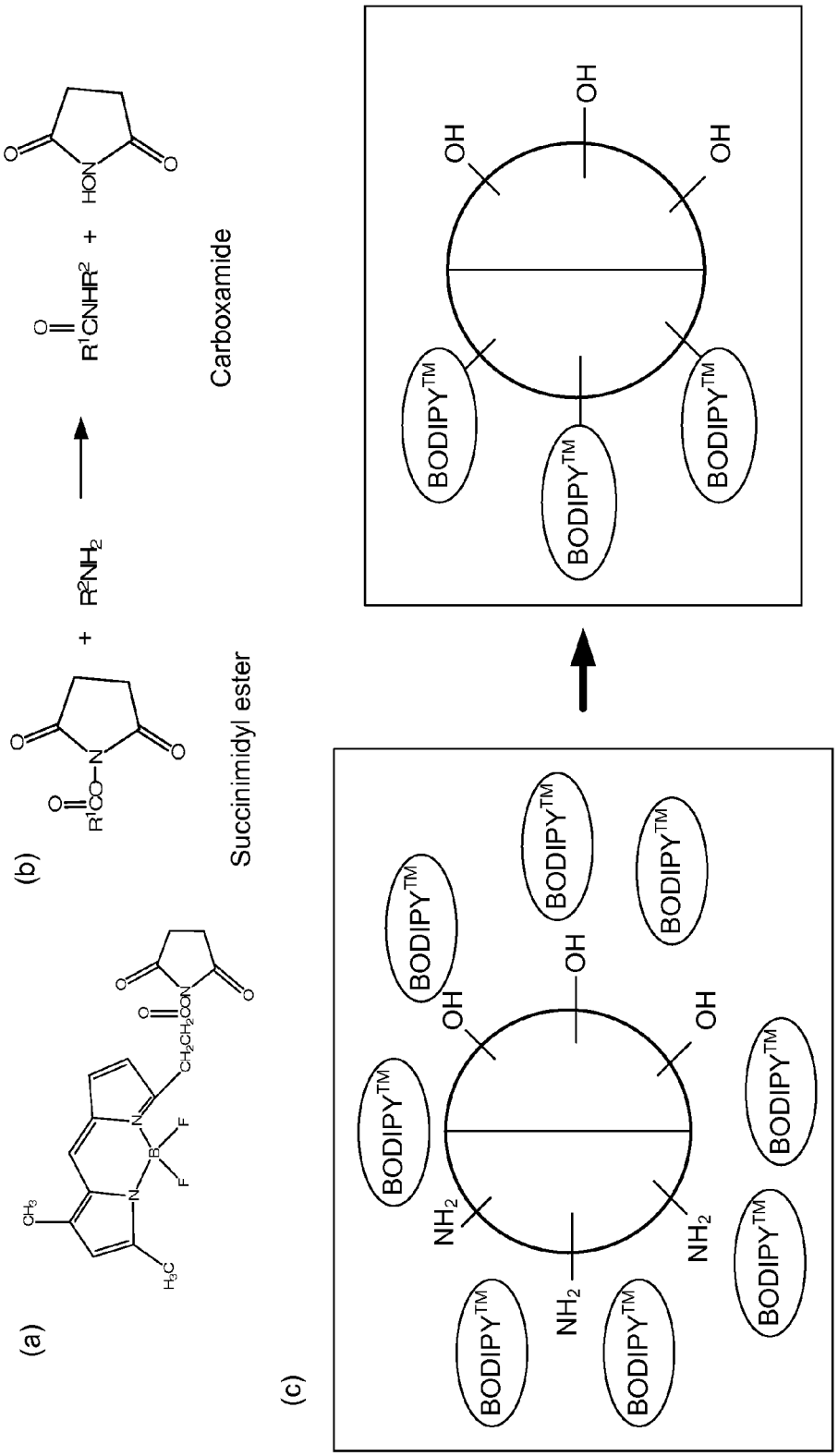
FIG. 8 is a diagram showing a chemical reaction in an example of the present disclosure showing chemical modification of an exposed phase surface.

In this example, the feasibility of selective reaction for further surface modification of biphasic particles is demonstrated. One side of a jetting solution is composed of PEO (MW 600,000) 2%, 4-arm-star-shaped PEO with amine end groups (MW 10,000, Aldrich Co.) 0.5% and dextran (MW 70,000) 1% by weight dissolved in distilled water. The composition of the other side is PEO (MW 600,000) 2%; 4-armstar-shaped PEO with hydroxyl end groups (MW 10,000, Aldrich Co.) 0.5% and rhodamine-B-dextran (MW 70,000) 1% by weight in distilled water. Dextran and hydroxyl end group star PEO are employed in each phase in order to ensure equal properties related to the jetting. Each side of the jetting solution is electrospun as a mono-phase to be examined as control experiments. At similar experimental conditions, i.e. 7 kV electrical potential, 25 cm distance between the electrodes and a flow rate of 0.06 ml/hour, both solutions are successfully electrospun to form a beads-on-string morphology on top of glass substrate with the same experimental setup as described in the previous section. Biphasic jetting is performed at 6 kV, 25 cm, 0.05 ml/hour for both sides. The electrospun fibers on top of the glass slide from two control mono-phasic jettings and the biphasic jetting are then immersed in BODIPY® solutions in n-hexane for 15 minutes. Since n-hexane is a non-solvent for all of the components, beads-on-string morphology on top of the glass slide remains after the immersing step. Using the specific reaction between the amine and succinymidyl ester, BODIPY® dyes are covalently attached to the surface with amine groups selectively, as shown in FIG. 8. After this reaction step, the glass slides are immersed in an excess amount of clean n-hexane to make sure all possibly non-selectively adsorbed or diffused-in dyes from the biphasic particles are washed out. The products are then examined by confocal microscopy. Excitation lasers are used as described in the previous section, and the absorption wavelength windows for BODIPY® and Rhodamine are 512 to about 539 nm and 630 to about 670 nm, respectively. Rhodamine absorption wavelength window is a designated longer wavelength region than usual in order to tail out the excitation spectrum of BODIPY®.

EXAMPLE 3

Biphasic nano-components are made form polymer/inorganic material hybrids and are imaged by transmission microscope (Model CM12, Philips). The two jetting solutions are designed to give a contrast by the difference in electron density of each side. The darker side jetting solution consists of 2% PEO (MW 600,000 g/mol), 0.5% sodium polystyrene sulfonate (PSS, MW 200,000 g/mol, Aldrich, USA) and 0.3% silver nitrate dissolved in distilled water. Though the solution is kept in dark, dark spots in the TEM picture are due to atomic silver nanocrystals. The lighter side jetting solution consists of 2% PEO and 0.5% FITC-conjugated-dextran. The macromolecular fluorescent dye is mixed in to examine the same sample with a confocal microscope to confirm the biphasic character. Samples for TEM experiments are prepared by direct jetting on to carbon coated copper grid (400 mesh, TED PELLA, Redding Calif., USA). The morphology characterization of nano-components are performed using a Scanning Electron Microscope (Model XL 30) manufactured by Phillips. Internal structure and the detailed structural features such as electron density and crystalline structures of each phase are investigated by transmission electron microscope (JEOL 301 1, Japan).

EXAMPLE 4

A biphasic object which has primary amine groups in one side is produced using polyethylene imine ("PEI") in one side of jetting solution. Jetting is performed using carbon film coated copper grid on top of aluminum foil as a collecting substrate. About 1 mg of eosin isothiocyantate is solubilized in 100 mL of n-hexane. Immersing the biphasic object on top of copper grid into the eosin solution is performed for 20 min. After this reaction step, the grid is also put in the clean hexane for 60 min to clean out the possible unselectively attached dye. TEM experiments show biphasic character.

EXAMPLE 5

Core and Shell Formation

In this example, Fluid A and Fluid B are delivered in a configuration shown in FIG. 4. Fluid A comprises a poly (lactide-co-glycolide) polymer (PLGA) in a solvent system comprising acetonitrile and water. Fluid B comprises an aqueous emulsion containing a lipophilic active ingredient, Cyclosporin, suspended in water. The fluids are processed under similar conditions described in Example 1. Fluid B becomes a core containing a lipophilic active ingredient and Fluid A becomes a shell surrounding Fluid B that is hydrophilic.

EXAMPLE 5

MPNs Having Charged Surfaces

An aqueous solution of 95 weight % polyethylene imine (PEI), and 5 wt. % poly(acryl amide-co-acrylic acid) (PAAm-co-AA) is co-jetted with an aqueous solution of 95 wt. % poly(acrylic acid) (PAA) and 5 wt. % PEI. Each respective solution is loaded with a different colorant (dye), for example, one colorant may be selected to be dextran and another fluorescein isothiocyanate (FITC). Two parallel polymer flows are introduced in a nozzle that contains inlets in a side-by-side geometry, such as is shown in FIG. 2. Under these conditions, a droplet forms at the tip of the nozzle. Upon application of a sufficiently strong electrical field (about 5 to about 10 kW) between the nozzle and a counter electrode, which serves as the collector, a polymer thread is ejected from the droplet resulting in biphasic nanoparticles, where one phase is predominately positively charged and the other phase is predominately negatively charged.

EXAMPLE 6

Multiphasic Disk-Shaped MPNs

A solution of 5 wt. % poly(lactide-co-glycolide) polymer (PLGA) in chloroform is co-jetted with a solution of 5 wt. % PLGA in chloroform. Two parallel polymer flows are introduced in a nozzle with the configuration described above for Example 4 (side-by-side geometry). Under these conditions, a droplet forms at the tip of the nozzle. Upon application of a sufficiently strong electrical field between the nozzle and a counter electrode, which serves as the collector, a polymer thread is ejected from the droplet resulting in biphasic disks with one phase predominately comprising PLGA (50:50) and the other phase predominately comprising PLGA (85:15).

EXAMPLE 7

Hydrophobic/Hydrophilic MPNs

A solution of 5 wt. % PLGA in chloroform is co-jetted with a solution of 5 wt. % PLGA in chloroform and a polylactic acid (PLA) having (on average) at least one acetylene group per molecule. A side-by-side jetting apparatus is used, as described above in Example 4. Biphasic disks form where one phase has PLGA (50:50) and the other phase has PLGA (85:15) with acetylene-modified PLA. A functionalized surface is provided for one phase by subsequent reaction/conversion of acetylene with an azide-polyoxyethylene glycol (Azide-PEG) ligand, which results in PEG-ylation of a surface (a hemisphere) of the biphasic nanoparticles, providing the functionalized side with hydrophilic properties and the PLGA phase with hydrophobic properties.

While embodiments of the disclosure have been illustrated and described, it is not intended that these embodiments illustrate and describe all possible forms of the disclosure. Rather, the words used in the specification are words of description rather than limitation, and it is understood that various changes may be made without departing from the spirit and scope of the disclosure.

What is claimed is:

1. A method of forming a nano-component comprising at least one colorant, the method comprising:
    forming a composite stream by contacting a portion of a first liquid stream with a portion of a second liquid stream, wherein said first and second liquid streams are compositionally distinct from one another and at least one of said first and second liquid streams comprises a colorant; and
    exposing at least a portion of the composite stream to an electric force field sufficient to form a solid nano-component comprising a first phase and a second distinct phase, wherein said first phase comprises material from said first liquid stream and said second phase comprises material from said second liquid stream, such that said first phase and said second phase are compositionally distinct from one another, wherein said first phase comprises a first colorant and said second phase comprises a second colorant distinct from said first colorant and at least one of said first phase and said second phase comprises a polymer or polymer precursor, thus forming a nano-component having optically distinct phases.

2. The method of claim 1, wherein said first phase has a first exposed surface and said second phase has a second exposed surface.

3. The method of claim 2, further comprising treating at least one of said first and/or second exposed surfaces after formation of said solid nano-component to modify the chemical or physical characteristics of said first and/or second exposed surfaces.

4. The method of claim 1, wherein said first phase is a continuous phase and said second phase is a discontinuous phase within the solid nano-component.

5. The method of claim 1, wherein said first phase comprises a first component that is incompatible with a second component present in said second phase.

6. The method of claim 1, wherein said forming of said composite stream further comprises contacting a portion of an additional liquid stream with said first and second liquid streams, wherein said additional liquid stream is compositionally distinct from said first liquid stream and said second liquid stream and said exposing of said composite stream to an electric force field forms said solid nano-component comprising said first phase, said second phase, and an additional phase comprising a material from said additional liquid stream, wherein said first phase, said second phase, and said third phase are each compositionally distinct from one another.

7. The method of claim 1, wherein said solid nano-component has a shape selected from the group consisting of: spheres, rectangles, polygons, disks, ellipsoids, toroids, cones, pyramids, rods, cylinders, beads-on-a-string, and fibers.

8. The method of claim 1, wherein at least one of said first or second phases comprise a polymer selected from the group consisting of: sodium polystyrene sulfonate (PSS), polyethers, polyethylene oxide (PEO), polyethylene imine (PEI), polylactic acid, polycaprolactone, polyglycolic acid, poly (lactide-co-glycolide) polymer (PLGA), polyvinylpyrrolidone, hydroxyl alkyl cellulose, hydroxypropyl methyl cellulose (HPMC), hydroxypropyl cellulose (HPC), hydroxyethyl cellulose (HEC), methyl cellulose (MC), carboxymethyl cellulose (CMC), vinyl acetate, polyvinylpyrrolidone-vinyl acetate copolymer, polyvinyl alcohol (PVA), polyacrylate, polyacrylic acid (PAA), vinylcaprolactam/sodium acrylate polymer, methacrylate, poly(acryl amide-co-acrylic acid) (PAAm-co-AA), vinyl acetate, crotonic acid copolymer, polyacrylamide, polyethylene phosphonate, polybutene phosphonate, polystyrenes, polyvinylphosphonates, polyalkylenes, carboxy vinyl polymer, cellulose acetate, cellulose nitrate, ethylene-vinyl acetate copolymers, vinyl acetate homopolymers, ethyl cellulose, butyl cellulose, isopropyl cellulose, shellac, siloxanes, polydimethylsiloxane, polymethyl methacrylate (PMMA), cellulose acetate phthalate, natural or synthetic rubber; cellulose, polyethylene, polypropylene, polyesters, polyurethane, nylon, poly(aryleneethynylenes) (PAE), polythiophene, polyaniline, poly(p-phenylene), poly(p- phenyleneethynylene) (PPE), poly(p-phenylenevinylene), copolymers, derivatives, and mixtures thereof.

9. The method of claim 1, wherein at least one of said first phase or said second phase comprises a component reactive to a controllable external force field.

10. The method of claim 1, wherein at least one of said first phase and/or said second phase comprises a component and/or has an exposed surface that promotes self-assembly of the nano-component on a substrate.

11. The method of claim 1, wherein at least one of said first colorant or said second colorant comprises at least one material selected from a pearlescent pigment, a metallic flake pigment, a cholesteric liquid crystal (CLC) pigment, an ultramarine pigment, a fluorescent pigment, a phosphorescent pigment, an inorganic pigment, a carbon black pigment, a natural pigment, an organic pigment, a mixed metal oxide pigment, an iron oxide pigment, a titanium dioxide pigment, a metal colorant, a ceramic colorant, a plastic colorant, an organic azo pigment, an organic polycyclic pigment, a dyeing lake pigment, an azine pigment, a direct dye, a vat dye, a sulfur dye, a reactive dye, a disperse dye, an acid dye, an azoic dye, a synthetic dye, a basic dye, a laser dye, a polymeric dye, a natural dye, a fluorescent dye, and/or a phosphorescent dye.

12. A multiphasic nano-component comprising a first phase and at least one additional phase distinct from said first phase, wherein at least one of said first phase and said at least one additional phase comprises a polymer or polymer precursor and said first phase comprises a first colorant and said at least one additional phase comprises a second colorant distinct from said first colorant, thus forming a nano-component having optically distinct phases.

13. The multiphasic nano-component of claim 12, wherein said first phase and said at least one additional phase each have an exposed surface respectively, and said first phase has a first charge and said at least one additional phase has a second charge opposite to said first charge.

14. The multiphasic nano-component of claim 12, wherein said at least one additional phase further comprises a second phase and a third phase, wherein said first phase comprises a first dye, said second phase comprises a second dye, and said third phase comprises a third dye, wherein said first, second, and third dyes are distinct from one another.

15. The multiphasic nano-component of claim 14, wherein said first dye exhibits a red and/or orange color, said second dye exhibits a blue, cyan, indigo and/or violet color, and said third dye exhibits a yellow and/or green color, whereby the multiphasic nano-component emits a substantially white color.

16. The multiphasic nano-component of claim 12, wherein an amount of said first colorant present in said first phase in said nano-component is about 0.01% to about 90% by weight of the first phase and an amount of said second colorant present in said at least one additional phase is about 0.01% to about 90% by weight of the additional phase.

17. The multiphasic nano-component of claim 12, wherein said first phase comprises a first component that is incompatible with a second component present in said at least one additional phase.

18. The multiphasic nano-component of claim 12, wherein said solid nano-component has a shape selected from the group consisting of: spheres, rectangles, polygons, disks, toroids, cones, pyramids, rods, cylinders, beads-on-a-string, and fibers.

19. The multiphasic nano-component of claim 12, wherein said nano-component has a core-in-shell morphology comprising said first phase in the form of an external shell surface and said at least one additional phase disposed within said external shell surface to form a core.

20. The multiphasic nano-component of claim 12, wherein at least one of said first phase or said second additional phase comprises a component reactive to a controllable external force field.

21. The multiphasic nano-component of claim 12, wherein at least one of said first and said second colorants comprises a material selected from: a pearlescent pigment, a metallic flake pigment, a cholesteric liquid crystal (CLC) pigment, an ultramarine pigment, a fluorescent pigment, a phosphorescent pigment, an inorganic pigment, a carbon black pigment, a natural pigment, an organic pigment, a mixed metal oxide pigment, an iron oxide pigment, a titanium dioxide pigment, a metal colorant, a ceramic colorant, a plastic colorant, an organic azo pigment, an organic polycyclic pigment, a dyeing lake pigment, an azine pigment, a direct dye, a vat dye, a sulfur dye, a reactive dye, a disperse dye, an acid dye, an azoic dye, a synthetic dye, a basic dye, a laser dye, a polymeric dye, a natural dye, a fluorescent dye, and/or a phosphorescent dye.

22. The multiphasic nano-component of claim 12, wherein at least one of said first and second colorants comprises a material selected from a low-molecular weight dye, a laser dye, a textile dye, a paint dye, a paint pigment, a coating dye, a coating pigment, a plastic colorant, a metal colorant, a ceramic colorant, a fluorescent dye, a phosphorescent dye, a natural dye, a polymeric dye, an inorganic pigment and/or an organic pigment.

23. A multiphasic nano-component comprising a first phase and at least one additional phase distinct from said first phase, wherein at least one of said first phase and said at least one additional phase comprises a polymer or polymer precursor and wherein said first phase comprises a first colorant and said additional phase comprises a second colorant distinct from said first colorant and at least one of said first colorant and said second colorant comprise at least one material selected from a pearlescent pigment, a metallic flake pigment, a cholesteric liquid crystal (CLC) pigment, an ultramarine pigment, a fluorescent pigment, a phosphorescent pigment, an inorganic pigment, a carbon black pigment, a natural pigment, an organic pigment, a mixed metal oxide pigment, an iron oxide pigment, a titanium dioxide pigment, a metal colorant, a ceramic colorant, a plastic colorant, an organic azo pigment, an organic polycyclic pigment, a dyeing lake pigment, an azine pigment, a direct dye, a vat dye, a sulfur dye, a reactive dye, a disperse dye, an acid dye, an azoic dye, a synthetic dye, a basic dye, a laser dye, a polymeric dye, a natural dye, a fluorescent dye, and/or a phosphorescent dye, and wherein said first phase and said at least one additional phase each have an exposed surface and form a nano-component having optically distinct exposed surfaces.

* * * * *

UNITED STATES PATENT AND TRADEMARK OFFICE
CERTIFICATE OF CORRECTION

| | | |
|---|---|---|
| PATENT NO. | : 7,947,772 B2 | Page 1 of 1 |
| APPLICATION NO. | : 12/137121 | |
| DATED | : May 24, 2011 | |
| INVENTOR(S) | : Joerg Lahann et al. | |

It is certified that error appears in the above-identified patent and that said Letters Patent is hereby corrected as shown below:

On the Title Page, Item (56) 1st col. line 2, "4 βm" should be --μm--

Column 1, line 28 "electospinning" should be --electrospinning--

Column 4, line 3 "nano-components" should be --nano-component--

Column 5, line 39 "nano-particles" should be --nano-particle--

Column 7, line 31 "materials responses" should be --material responses--

Column 10, line 29 after "phases" delete "comprise"

Column 11, line 41 "liquids" should be --liquid--

Column 15, line 33 after "Acid Violet 5" insert --,--

Column 17, line 9 before "less than" insert --optionally--

Column 18, line 50 "concentrations" should be --concentration--

Column 19, line 5 "parameters. Viscosity," should be --parameters, viscosity,--

Column 21, line 19 after "such" insert --as--

Column 21, line 21 "know" should be --known--

Column 22, line 30 "nano-components" should be --nano-component--

Column 23, line 1 "phase" should be --phases--

Column 23, line 52 after "energies" delete "which"

Column 25, line 51 "Redding Calif" should be --Redding, Calif.--

Signed and Sealed this
Ninth Day of August, 2011

David J. Kappos
*Director of the United States Patent and Trademark Office*